United States Patent
Xiong

(10) Patent No.: US 12,231,992 B2
(45) Date of Patent: Feb. 18, 2025

(54) MULTICAST COMMUNICATION METHOD AND RELATED APPARATUS BASED ON USER EQUIPMENT (UE) ROUTE SELECTION POLICY

(71) Applicant: TENCENT TECHNOLOGY (SHENZHEN) COMPANY LIMITED, Shenzhen (CN)

(72) Inventor: Chunshan Xiong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 416 days.

(21) Appl. No.: 17/706,501

(22) Filed: Mar. 28, 2022

(65) Prior Publication Data
US 2022/0225058 A1    Jul. 14, 2022

Related U.S. Application Data

(63) Continuation of application No. PCT/CN2021/085586, filed on Apr. 6, 2021.

(30) Foreign Application Priority Data

May 13, 2020    (CN) ......................... 202010403660.X

(51) Int. Cl.
    *H04W 4/06*     (2009.01)
    *H04L 12/18*    (2006.01)
    (Continued)

(52) U.S. Cl.
    CPC ............ *H04W 4/06* (2013.01); *H04L 12/189* (2013.01); *H04W 8/18* (2013.01); *H04W 8/26* (2013.01); *H04W 72/30* (2023.01)

(58) Field of Classification Search
    CPC ......... H04W 76/40; H04W 4/06; H04W 4/08; H04W 8/18; H04W 8/26; H04W 72/30; H04L 12/189
    See application file for complete search history.

(56) References Cited

U.S. PATENT DOCUMENTS

2020/0045753 A1     2/2020  Dao et al.
2020/0351980 A1 * 11/2020  Talebi Fard .......... H04W 76/40
(Continued)

FOREIGN PATENT DOCUMENTS

| CN | 110999514 A | 4/2020 |
| CN | 111491346 A | 8/2020 |
| EP | 4024909 A1  | 7/2022 |

OTHER PUBLICATIONS

The World Intellectual Property Organization (WIPO) International Search Report for PCT/CN2021/085586 Jun. 29, 2021 5 Pages (including translation).
(Continued)

*Primary Examiner* — Allahyar Kasraian
(74) *Attorney, Agent, or Firm* — ANOVA LAW GROUP PLLC

(57) ABSTRACT

Embodiments of this application provide a multicast communication method and related apparatus. The multicast communication method is implemented by a user equipment and includes receiving UE route selection policy (URSP) information transmitted by a policy control function entity, the URSP information including a URSP rule supporting a multicast service; querying the URSP rule supporting the multicast service according to a multicast network address corresponding to a multicast service context that needs to be activated, to obtain network slice information and data network name information; and activating Multicast and Broadcast Service (MBS) context information of the user equipment based on the network slice information and the
(Continued)

data network name information, adding the user equipment to a multicast group corresponding to the multicast network address for multicast communication.

12 Claims, 17 Drawing Sheets

(51) Int. Cl.
*H04W 8/18* (2009.01)
*H04W 8/26* (2009.01)
*H04W 72/30* (2023.01)

(56) References Cited

U.S. PATENT DOCUMENTS

| | | | |
|---|---|---|---|
| 2020/0351984 A1* | 11/2020 | Talebi Fard | H04W 76/40 |
| 2022/0217508 A1 | 7/2022 | Xiong | |
| 2023/0052699 A1* | 2/2023 | Ninglekhu | H04W 60/04 |

OTHER PUBLICATIONS

Qualcomm Inc., "Solution: Integrated Multicast and Unicast Transport with Full Separation of MBS Service," SA WG2 Meeting #136-AH S2-2000266, Jan. 17, 2020 (Jan. 17, 2020), sections 1-2. 9 pages.

Nokia et al., "PDU session enhanced for multicast to provide the basic multicast connectivity service," SA WG2 Meeting #S2-136 S2-1911366, Nov. 22, 2019 (Nov. 22, 2019), entire document. 6 pages.

The European Patent Office (EPO) The Extended European Search Report for 21804630.8, Nov. 28, 2022 12 Pages (including translation).

Huawei et al: "MBS Session Management", 3GPP DRAFT;S2-2000489, 3rd Generation Partnership Project(3GPP), Mobile Competence Centre; 650, Route Des Lucioles: F-06921 Sophia-Antipolis Cedex: France. vol. SA WG2, No. Incheon , South Korea; Jan. 13-17, 2020 Jan. 7, 2020.

ZTE Wistron: "Network Initiated Trigger for PCF to update URSP rule in UE", 3GPP Draft; S2-187718, 3rd Generation Partnership Project (3GPP), Mobile Competence Centre; 650, Route Des Lucioles; F-06921 Sophiaantipolis Cedex; France, vol. SA WG2, No. Sophia Antipolis, France; Aug. 19-24, 2018 Aug. 14, 2018.

Tencent: "KI #1 , Sol #14: Update MBS Session Management procedure", 3GPP Draft; S2-2007567, 3rd Generation EPO Form 1703 01.91 Tri Partnership Project (3GPP), Mobile Competence Centre: 650. Route Des Lucioles: F-06921 Sophiaantipolis Cedex; France, vol. SA WG2, No. Elbonia; Oct. 12-23, 2020 Oct. 2, 2020.

* cited by examiner

Class A address:

Class B address:

Class C address:

Class D address:

Class E address:

IGMPv1 protocol header format

IGMPv2 protocol header format

IGMPv3 Membership Report message format

MULTICAST COMMUNICATION METHOD AND RELATED APPARATUS BASED ON USER EQUIPMENT (UE) ROUTE SELECTION POLICY

RELATED APPLICATIONS

This application is a continuation application of PCT Application No. PCT/CN2021/085586 filed on Apr. 6, 2021, which in turn claims priority to Chinese Patent Application No. 202010403660.X, entitled "MULTICAST COMMUNICATION METHOD, APPARATUS, COMPUTER-READABLE MEDIUM, AND ELECTRONIC DEVICE" and filed on May 13, 2020. The two applications are incorporated herein by reference in their entirety.

FIELD OF THE TECHNOLOGY

This application relates to the field of computer and communication technologies, and in particular, to multicast communication.

BACKGROUND OF THE DISCLOSURE

"Multicasting" is to transmit the same content to a plurality of target nodes, for example, to a plurality of user equipment (UEs). Using the multicast mode not only can realize the transmission of data to all target nodes at a time, but also can achieve the purpose of transmitting data only to specific objects.

SUMMARY

Embodiments of this application provide a multicast communication method, apparatus, computer-readable medium, electronic device, and computer program product including instructions, which can simplify the multicast context activation process at least to a certain extent, thereby reducing the complexity of network deployment.

Other features and advantages of this application become obvious through the following detailed descriptions, or may be partially learned through the practice of this application.

According to an aspect of the embodiments of this application, a multicast communication method is provided. The multicast communication method is implemented by a user equipment and includes receiving UE route selection policy (URSP) information transmitted by a policy control function entity, the URSP information including a URSP rule supporting a multicast service; querying the URSP rule supporting the multicast service according to a multicast network address corresponding to a multicast service context that needs to be activated, to obtain network slice information and data network name information; and activating Multicast and Broadcast Service (MBS) context information of the user equipment based on the network slice information and the data network name information, adding the user equipment to a multicast group corresponding to the multicast network address for multicast communication.

According to an aspect of the embodiments of this application, a multicast communication method is provided. The multicast communication method is implemented by a session management function entity (SMF), and includes acquiring identification information of a user equipment, a multicast network address corresponding to a multicast service context that the user equipment needs to activate, and network slice information and data network name information selected by the user equipment according to a UE route selection policy (URSP) rule supporting a multicast service; generating a multicast service authorization request notification message according to the network slice information, the data network name information, the identification information of the user equipment, and the multicast network address; and transmitting the multicast service authorization request notification message to an application function entity corresponding to a Multicast and Broadcast Service (MBS), to activate MBS context information of the user equipment.

According to an aspect of the embodiments of this application, a multicast communication method is provided. The multicast communication method is implemented by a multicast and broadcast service function (MBSF), and includes receiving a multicast service authorization request notification message transmitted by a session management function entity corresponding to a multicast service, the multicast service authorization request notification message including identification information of a user equipment, a multicast network address corresponding to a multicast service context that the user equipment needs to activate, and network slice information and data network name information selected by the user equipment according to a UE route selection policy (URSP) rule supporting a multicast service; and transmitting the multicast service authorization request notification message to an application function entity corresponding to a Multicast and Broadcast Service (MBS), to activate MBS context information of the user equipment.

According to an aspect of the embodiments of this application, a non-transitory computer-readable storage medium is provided, storing a computer program, the computer program, when executed by a processor, implementing the multicast communication method according to any one of the above aspects.

According to an aspect of the embodiments of this application, an electronic device is provided, including: one or more processors; and a memory, configured to store one or more programs, the one or more programs, when executed by one or more processors, causing the one or more processors to implement the multicast communication method according to any one of the above aspects.

In the technical solutions provided by some embodiments of this application, by receiving URSP information including a URSP rule supporting a multicast service, querying the URSP rule according to a multicast network address corresponding to a multicast service context that needs to be activated, to obtain network slice information and data network name information, and activating MBS context information of a user equipment based on the network slice information and the data network name information, the user equipment can directly select the corresponding network slice information and data network name information according to the URSP rule supporting the multicast service, and activate the MBS context information according to the network slice information and the data network name information. As such, the multicast context activation process is simplified, thereby reducing the complexity of network deployment and improving the efficiency of multicast communication.

It is to be understood that the foregoing general descriptions and the following detailed descriptions are merely for illustration and explanation purposes and are not intended to limit this application.

BRIEF DESCRIPTION OF THE DRAWINGS

Accompanying drawings herein are incorporated into a specification and constitute a part of this specification, show embodiments that conform to this application, and are used for describing a principle of this application together with this specification. Obviously, the accompanying drawings in the following descriptions are merely some embodiments of this application, and a person of ordinary skill in the art may further obtain other accompanying drawings according to the accompanying drawings without creative efforts. In the accompanying drawings.

DESCRIPTION OF EMBODIMENTS

At present, the examples of implementations are described comprehensively with reference to the accompanying drawings. However, the examples of implementations may be implemented in multiple forms, and it should not be understood as being limited to the examples of implementations described herein. Conversely, the implementations are provided to make this application more comprehensive and complete, and comprehensively convey the idea of the examples of the implementations to a person skilled in the art.

In addition, the described features, structures, or properties may be combined in one or more embodiments in any appropriate manner. In the following descriptions, specific details are provided to give a comprehensive understanding of the embodiments of this application. However, a person skilled in the art is to be aware that, the technical solutions in this application may be implemented without one or more of the particular details, or another method, unit, apparatus, or step may be used. In other cases, well-known methods, apparatuses, implementations, or operations are not shown or described in detail, to avoid obscuring the aspects of this application.

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change according to an actual case.

"Plurality of" mentioned herein means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects.

2G (2nd generation mobile communications), 3G (3rd generation mobile communications), and 4G (4th generation mobile communications) wireless communication systems support Multimedia Broadcast Multicast Services (MBMS), which includes broadcast and multicast services. However, only 2G and 3G systems support multicast services, 4G systems do not support multicast services in standards, and 2G, 3G, and 4G systems all support broadcast services.

Figure 1:
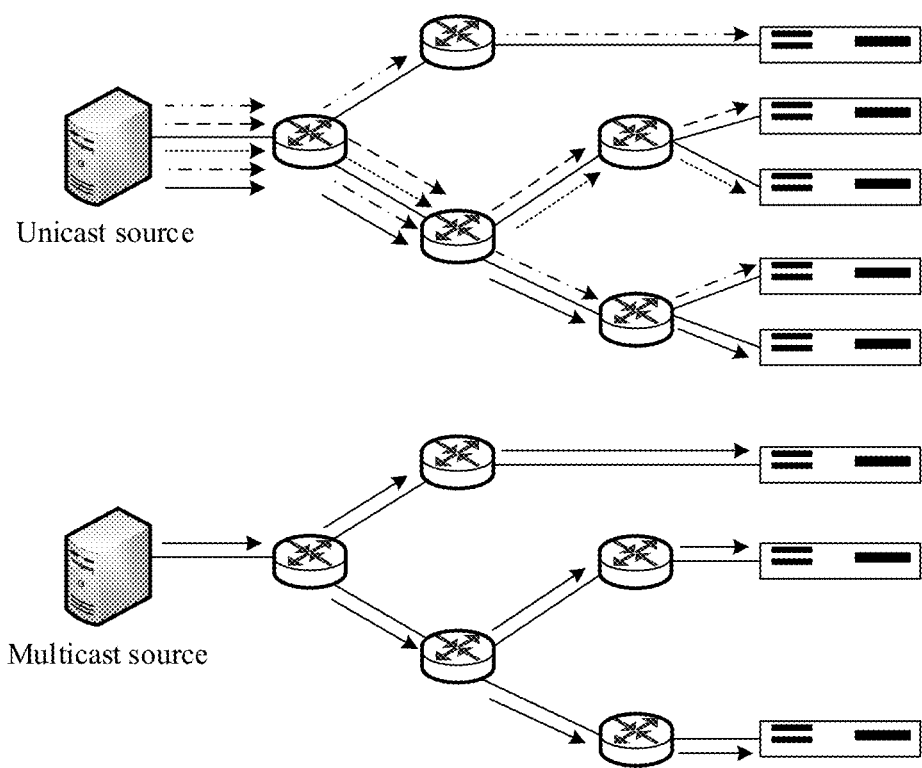
FIG. 1 is a schematic flowchart showing data transmission in a unicast communication system and a multicast communication system.

In addition to broadcast and multicast services, communication between network nodes also includes unicast. "Unicast" is the most commonly seen one-to-one communication, and is advantageous in that the sender can transmit different contents to different recipients. However, if the sender needs to transmit the same content to a plurality of recipients, the sender needs to transmit a plurality of copies of the same data to the plurality of recipients in an end-to-end manner, which is inefficient. Specifically, as shown in FIG. 1, when a unicast source sends data to a plurality of recipients in unicast mode, the unicast source needs to transmit a plurality of copies of the same data in an end-to-end manner (where different line types in FIG. 1 represent different data flows carrying the same data).

"Multicasting" means that a sender transmits the same content to a plurality of recipients. Multicasting is especially suitable for online video conferencing and online video-on-demand. This is because that if the unicast mode is used, there will be as many transmissions as there are recipients, which is obviously very inefficient; if the broadcast mode that does not distinguish the targets but sends the data to all the targets is adopted, although the data can be transmitted at a time, the purpose of distinguishing specific data recipients cannot be achieved. As such, using the multicast mode not only can realize the transmission of the same data to a plurality of recipients at a time, but also can achieve the purpose of transmitting data only to specific objects. Specifically, as shown in FIG. 1, a multicast source may send the same data to a plurality of recipients at a time.

"Broadcasting" also transmits the same content to a plurality of recipients, but does not allow for selection of recipients during transmission. Therefore, the data may be unnecessarily transmitted to some devices, resulting in a waste of network resources. In addition, some recipients may not be "interested" in the broadcast content, so after receiving the broadcast content, these recipients have to discard the received data packets, which also results in a waste of terminal resources.

The fundamental difference between the broadcast service and the multicast service lies in that all UEs in a system can participate in the broadcast service without subscription, but cannot participate in the multicast service without subscription and authentication. Moreover, there are many types of multicast services and broadcast services. For a multicast service, a UE joins a multicast group of the corresponding service based on an IP multicast address. The broadcast services are distinguished by different areas, so that there is only one broadcast service in a certain area, and this broadcast service can transmit different services in different time periods.

Figure 2:
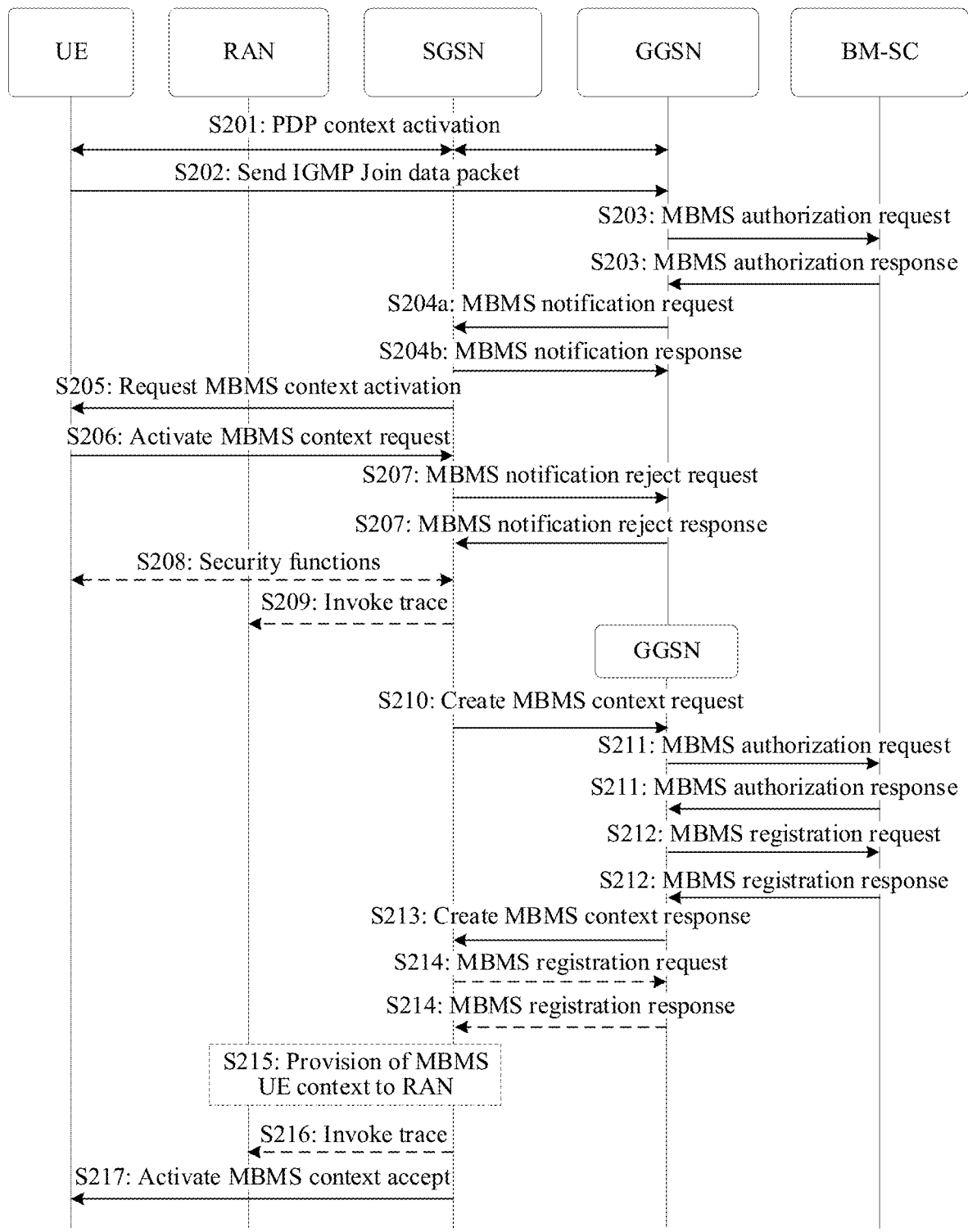
FIG. 2 is a schematic diagram of a multicast context activation process of MBMS.

An MBMS multicast context activation process is defined in clause 8.2 in 3rd Generation Partnership Project (3GPP) TS 23.246, which, as shown in FIG. 2, includes the following steps:

S201: A UE selects an Access Point Name (APN) to establish a Packet Data Protocol (PDP) Context, and then assigns an IP address to the UE. For the convenience of subsequent description, the APN selected by the UE in this step is identified by APN0.

S202: The UE selects an IP Multicast Address (where the IP multicast address is used to identify a multicast service), and then sends an IGMP Join data packet to a Gateway GPRS Support Node (GGSN) to indicate that the UE wants to join this multicast service.

S203: The GGSN sends an MBMS authorization request to a Broadcast Multicast Service Center (BM-SC), and receives an MBMS authorization response fed back by the BM-SC. The BM-SC verifies whether the UE can join the multicast group according to subscription data of the UE, and if determining that the UE can join the multicast group, adds an APN that the UE needs to use to join the multicast group into the MBMS authorization response (where the APN is identified by APN1), and then transmits the APN1 to be used by the UE to the UE through S204*a*, S204*b*, and S205.

S206: The UE initiates a new MBMS Session according to the APN1 provided by the BM-SC, that is, sends an MBMS context activation request, where the MBMS context activation request includes the IP Multicast Address, the APN1, and an MBMS capability of the UE. The MBMS capability may be, for example, a Quality of Service (QoS) capability.

S207: A Serving GPRS Support Node (SGSN) checks whether the UE has subscribed to the APN1. If the check fails, the SGSN sends an MBMS notification reject request to the GGSN, and the GGSN sends an MBMS notification reject response to the SGSN. The subscription data of the UE is stored in a Home Subscriber Server (HSS), and the interaction process between the SGSN and the HSS is not shown in FIG. 2. In addition, for specific processes of S208 and S209 in FIG. 2, refer to the MBMS context activation process defined in clause 8.2 in TS 23.246.

S210: If the check of the UE by the SGSN is successful, the SGSN selects another GGSN (i.e., a GGSN supporting the Multicast service) according to the APN1, and sends a create MBMS context request message to the GGSN, where the message includes an ID of the UE, a UE Location ID, the IP Multicast Address, APN1, and access information (e.g., 2G or 3G) of the UE.

The ID of the UE may be an International Mobile Subscriber Identity (IMSI) or a Mobile Station International Integrated Service Digital Network Number (MSISDN). The UE Location ID may be a Radio Access Technology (RAT) ID, a Common Gateway Interface (CGI), or a Service Area Identity (SAO.

S211: The GGSN sends an MBMS authorization request to the BM-SC, and the BM-SC authorizes the UE according to the subscription information of the UE and feeds back an MBMS authorization response to the GGSN.

S212: If access of the UE is authorized and there is no context of any UE indicated by the IP Multicast Address on the GGSN, that is, the UE is the first to access the multicast service identified by the IP Multicast Address on the GGSN, the UE registers with the upstream node BM-SC to indicate that multicast service data to be sent to the IP multicast Address needs to be sent to this GGSN. (Note: Different GGSNs may be selected for different UEs, so when the BM-SC sends multicast data downstream, the same multicast data needs to be sent to these GGSNs at the same time).

S213: The GGSN creates an MBMS UE context of the UE corresponding to the IP Multicast Address, and then sends a create MBMS context response to the SGSN to indicate that the MBMS context is successfully created.

S214: Similar to S212, if there is no context of any UE indicated by the IP Multicast Address on the SGSN, that is, the UE is the first to access the multicast service identified by the IP Multicast Address on the SGSN, the UE registers with the upstream node GGSN to indicate that multicast service data to be sent to the IP multicast Address needs to be sent to this SGSN. (Note: Different SGSNs may be selected for different UEs, so when the GGSN sends multicast data downstream, the same multicast data needs to be sent to these SGSNs at the same time).

For specific processes of S215 to S217 in FIG. 2, refer to the MBMS context activation process defined in clause 8.2 in TS 23.246.

It can be seen from the process shown in FIG. 2 that a UE in 2G or 3G first establishes a PDP Context through an APN0, is assigned an IP address, and then sends an IGMP Join data packet to the network with this IP address; the GGSN needs to intercept this IGMP Join data packet, and then send a signaling (i.e., MBMS authorization request) to a BM-SC; the BM-SC allocates an APN1 to the UE; then the UE sends a request MBMS context activation message with this APN1, thus activating an MBMS context.

This method of the process shown in FIG. 2 has the following disadvantages. Almost all GGSNs need to intercept the IGMP Join data packet and then send a signaling (i.e., MBMS authorization request) to the BM-SC, which increases the complexity of development of GGSNs. In addition, the UE needs to use two APNs, one APN being used for establishing a PDP Context to send the IGMP Join data packet, and the other APN being used for the MBMS service. Obviously, the use of two APNs increases the complexity of the UE and the complexity of network deployment.

Figure 3:
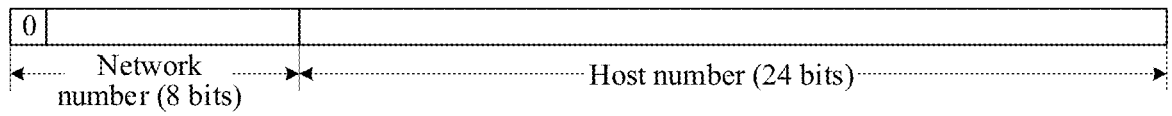
FIG. 3 is a schematic diagram showing classes of IPv4 network addresses.
Figure 3:
Figure 3:
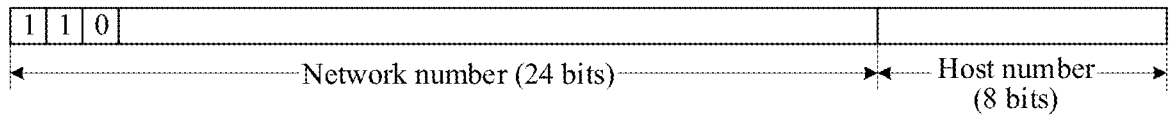
Figure 3:
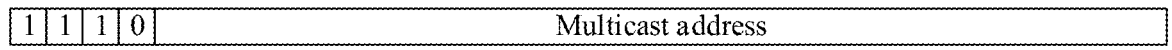
Figure 3:
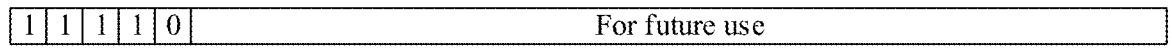

The multicast address of MBS may be an IPv4 multicast address or an IPv6 multicast address. As shown in FIG. 3, IPv4 network addresses are classified into class A addresses, class B addresses, class C addresses, class D addresses, and class E addresses. In the class A address, the first byte (8 bits) is network number, and the other three bytes (24 bits) are host number. The range of the class A address is: 0.0.0.0 to 127.255.255.255. In the class B address, the first byte and the second byte are network number, and the other two bytes are host number. The range of the class B address is: 128.0.0.0 to 191.255.255.255. In the class C address, the first three bytes are network number, and the fourth byte is host number. The range of the class C address is: 192.0.0.0 to 223.255.255.255. Class D addresses are multicast addresses. The first four bits of the class D address are "1110". The range of the class D address is: 224.0.0.0 to 239.255.255.255. Class E addresses are reserved addresses. The first five bits of the class E address are "11110". The range of the class E address is: 240.0.0.0 to 247.255.255.255.

Figure 4:
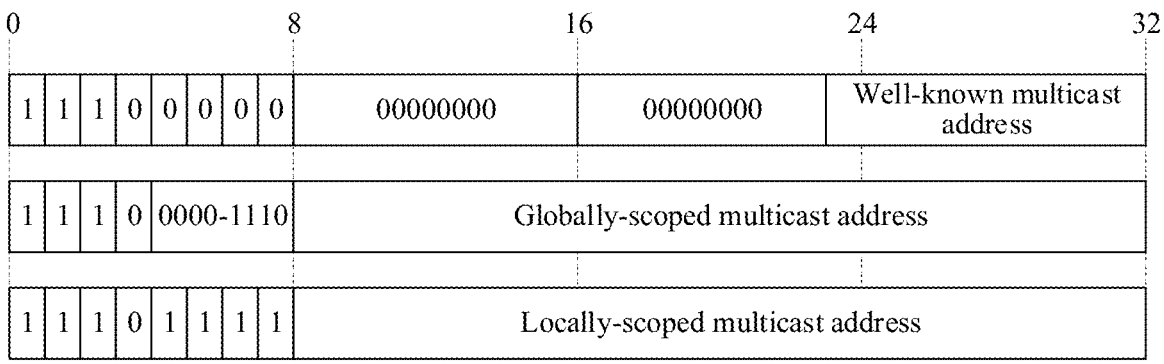
FIG. 4 is a schematic structural diagram of an IPv4 multicast address.

As shown in FIG. 4, IPv4 multicast addresses may be one of three structures, which are respectively applicable to Well-Known multicast addresses, Globally-Scoped multicast addresses, and Locally-Scoped multicast addresses.

Figure 5:
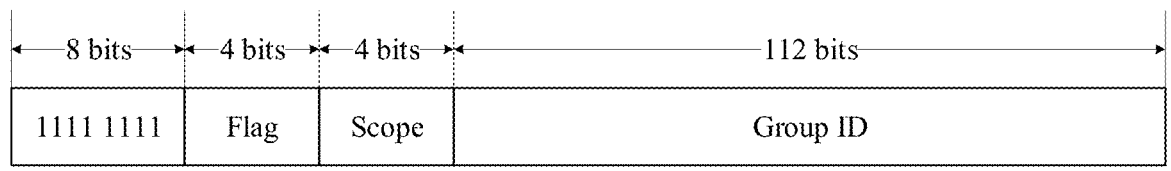
FIG. 5 is a schematic structural diagram of an IPv6 multicast address.

A structure of an IPv6 multicast address is as shown in FIG. 5, where the first byte (8 bits) indicates that the address is a multicast address, the next four bits are a flag field, and the next four bits are a scope field, and the last 112 bits are a group ID.

The first bit of the flag field is 0, which is reserved for future use. The second bit of the flag field indicates whether the multicast address is embedded with a Rendezvous Point (RP). The RP is a distribution point for a specified multicast stream in the multicast network. For example, when the second bit has a value of 0, it indicates that no rendezvous point is embedded; when the second bit has a value of 1, it indicates that a rendezvous point is embedded. The third bit of the flag field indicates whether prefix information is embedded in the multicast address. For example, when the third bit value has a value of 0, it indicates that no prefix information is embedded; when the second bit value has a value of 1, it indicates that prefix information is embedded. The last bit of the flag field indicates whether the multicast address is a permanently assigned multicast address or a transient multicast address. For example, when the last bit has a value of 0, it indicates that the multicast address is a permanently assigned multicast address; when the last bit has a value of 1, it indicates that the multicast address is a transient multicast address.

The function of the scope field is to limit the scope of the multicast address. The values and descriptions of the scope field are as shown in Table 1:

TABLE 1

| Value | Description |
| --- | --- |
| 0 | Reserved |
| 1 | Interface-Local scope, called Node-local scope in earlier specification |
| 2 | Link-Local scope |
| 3 | Reserved |
| 4 | Admin-Local scope |
| 5 | Site-Local scope |
| 6, 7 | Unassigned |

TABLE 1-continued

| Value | Description |
| --- | --- |
| 8 | Organization-Local scope |
| 9. A, B, C, D | Unassigned |
| E | Global scope |
| F | Reserved |

In multicast communication, the multicast address can only be used as a destination IP address (that is, the destination IP address in the IP header), and the multicast address cannot be used as a source IP address. In the multicast services of MBMS (2G, 3G) and MBS (5G), multicast data packets are all sent down by the network side to UEs, that is, the multicast data packets are all downlink (DL) data packets, and the UEs cannot send data to the network side through the corresponding multicast address. That is to say, the UE cannot use the multicast address as the destination IP address to send an uplink IP packet, that is, there is no uplink (UL) multicast data.

Figure 6:
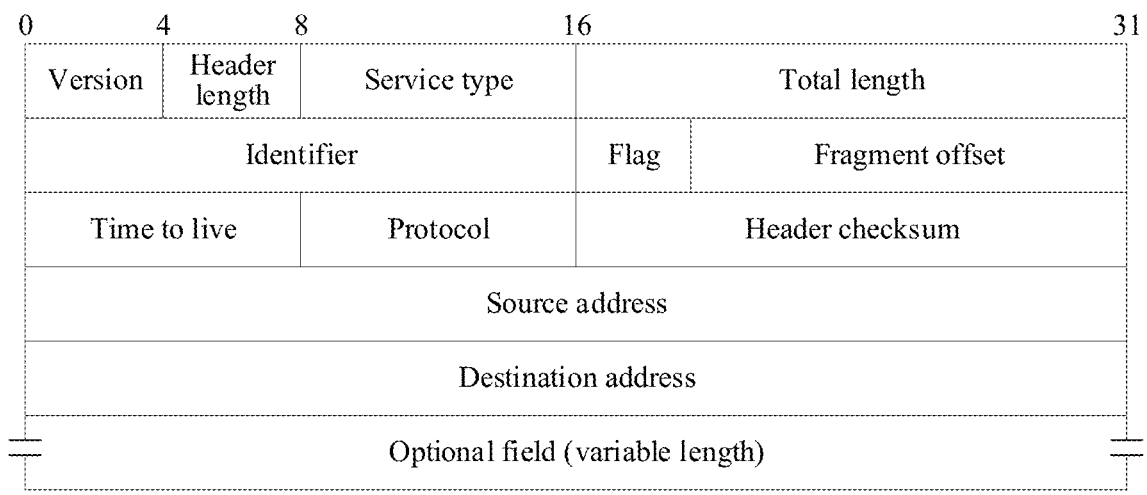
FIG. 6 is a schematic structural diagram of an IPv4 header.

An IP packet transmitted in a network is composed of two parts: an IP header and data. As shown in FIG. 6, a structure of an IPv4 header mainly includes: "version" field, "header length" field, "service type" field, "total length" field, "identifier" field, "flag" field, "fragment offset" field, "time to live" field, "protocol" field, "header checksum" field, "source address" field, "destination address" field, and "optional field".

The "version" field occupies 4 bits and refers to the version of the IP protocol, for example, the version number is 4 (i.e., IPv4). The "header length" field occupies 4 bits. The "service type" field occupies 8 bits and is used to obtain a better service. The "total length" field occupies 16 bits and refers to the length of the sum of the header and data. The "identifier" field occupies 16 bits and is a counter used to generate an identifier of a datagram. The "flag" field occupies 3 bits. The least significant bit of the "flag" field is MF (More Fragment). If MF=1, it means that there are "more fragments" later. If MF=0, it means that it is the last fragment. The middle bit of the "flag" field is DF (Don't Fragment), and fragmentation is allowed only when DF=0. The "fragment offset" field occupies 12 bits, and refers to the relative position of a certain fragment obtained by fragmenting a long packet in the original packet. The "time to live" field is TTL (Time To Live), which occupies 8 bits. The TTL field is a field initially set by the sender. The "protocol" field occupies 8 bits and is used to indicate which protocol the data carried in this datagram uses, where a value of "1" indicates an Internet Control Message Protocol (ICMP) protocol; a value of "2" indicates an IGMP protocol; a value of "6" indicates a Transmission Control Protocol (TCP) protocol; a value of "17" indicates a User Datagram Protocol (UDP) protocol; a value of "50" indicates an Encapsulating Security Payload (ESP) protocol; and a value of "51" indicates an Authentication Header (AH) protocol. The "header checksum" field occupies 16 bits, where only the header of the datagram is checked, and the data part is not checked. The "source address" field and the "destination address" field each occupy 4 bytes, and are used to record the source address and the destination address respectively.

Figure 7:
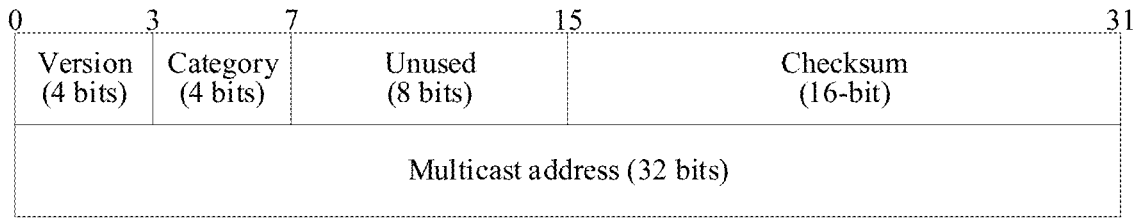
FIG. 7 is a schematic diagram of a protocol header format of IGMPv1, a protocol header format of IGMPv2, and a format of a membership report message in IGMPv3.
Figure 7:
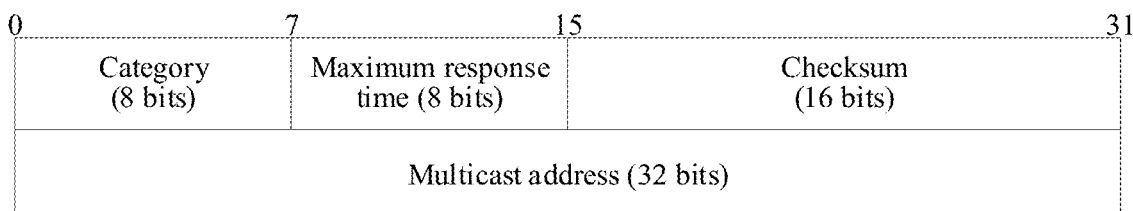
Figure 7:
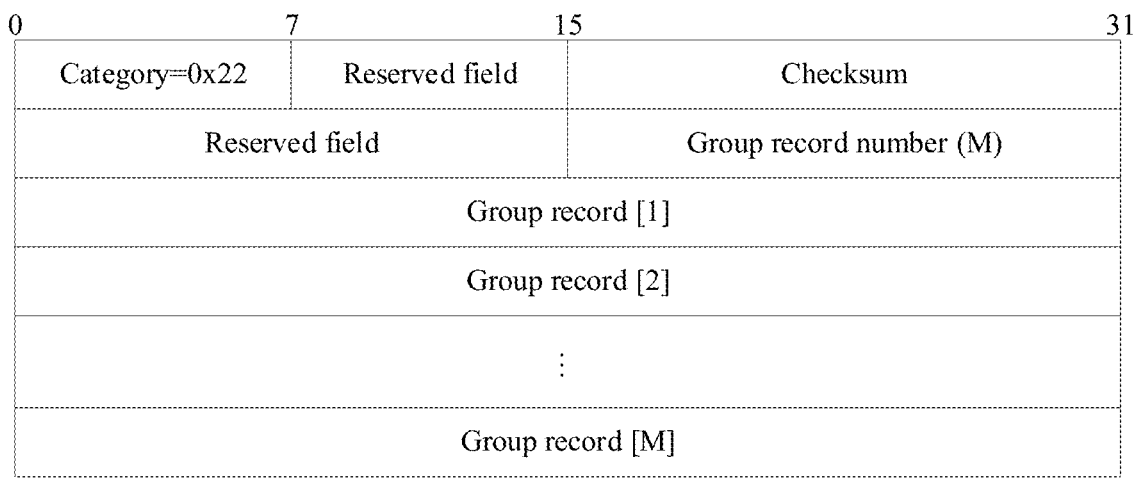

For the IGMP protocol mentioned above, there are three protocol versions, namely, IGMPv1, IGMPv2, and IGMPv3, and the corresponding standards are RFC1054, RFC2236, and RFC3376 respectively. A protocol header format of IGMPv1 and a protocol header format of IGMPv2 are shown in FIG. 7, where A protocol header of IGMPv1 includes a 4-bit IGMP version field, a 4-bit IGMP packet type field (where a value of 1 indicates a Host Membership Query type; and a value of 2 indicates a Host Membership Report type), an 8-bit unused field (where this field is filled with 0 when sending and is ignored when receiving), a 16-bit IGMP checksum field (when transmitting a packet, the check word must be calculated and inserted into this field; when a packet is received, this field must be checked before processing the packet), and a 32-bit multicast address field.

A protocol header of IGMPv2 includes an 8-bit packet type field, an 8-bit maximum response time field, a 16-bit IGMP checksum field, and a 32-bit multicast address field.

The packet type field in the protocol header of IGMPv2 can indicate one of the following types: 0x11=Membership Query, indicating an IGMP membership query message; 0x12=Version 1 Membership Report, indicating a membership report message of IGMPv1; 0x16=Version 2 Membership Report, indicating a membership report message of IGMPv2; and 0x17=Leave Group, indicating a leave message. In IGMPv2, the old 4-bit version field and the old 4-bit type field are combined into a new 8-bit type field. The type codes of the membership query message (version 1 and version 2) and the membership report message of version 1 are set to 0x11 and 0x12 respectively to maintain backward compatibility with the IGMP version 1 and version 2 packet formats.

The maximum response time field in the protocol header of IGMPv2 is used to indicate the maximum time (in units of 1/10 second) before a response report is sent, and has a default value of 10 seconds. Similar to IGMPv1, when transmitting a packet, the checksum must be calculated and filled in the checksum field in the protocol header of IGMPv2; when receiving a packet, the checksum must be checked before processing the packet, to determine whether an error occurred during transmission of the IGMP message.

Still referring to FIG. 7, a format of a membership report message in IGMPv3 includes a type field (because it is a membership report message, type=0x22), a reserved field, a checksum field, a group record number field, and a group record field. The IGMP Join data packet shown in FIG. 2 is implemented by an IGMP membership report message. For IGMPv3, the destination IP address in the IP packet of the IGMP Join message is not the IP multicast address to be added, but instead the IP multicast address to be joined is included in the parameters of the message.

In clause 6.6.2 in the 5G specification TS 23.503, it is given that the URSP includes one or more URSP rules, and it is pointed out that each URSP rule corresponds to one precedence, a traffic descriptor is used to describe application traffic of the UE, and there are one or more route selection descriptors corresponding to this application traffic, from which a route selection descriptor is selected for establishing a PDU session to transmit this application and its traffic (see clause 6.6.2 in TS 23.503 for details). The definition of the route selection descriptor is as shown in Table 6.6.2.1-3 of clause 6.6.2 in TS 23.503.

A URSP includes one or more URSP rules, and each URSP Rule has a precedence; A URSP Rule can have multiple route selection descriptors, and each route selection descriptor has precedence. A route selection descriptor includes one or more route selection components, and a route selection component can take a single value or a set of values.

Information included in a URSP rule is as shown in Table 2 below. Optional items in Table 2 may or may not appear:

TABLE 2

| Information name | Description | Category | PCF permitted to modify in a UE context | Scope |
| --- | --- | --- | --- | --- |
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| IP descriptors (NOTE 5) | Destination IP 3 tuple(s) (IP address or IPv6 network prefix, port number, protocol ID of the protocol above IP) | Optional | Yes | UE context |
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |

TABLE 2-continued

| Information name | Description | Category | PCF permitted to modify in a UE context | Scope |
| --- | --- | --- | --- | --- |
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", etc., are defined in TS 24.526 [19], More than one connection capabilities value can be provided.
(NOTE 5):
A URSP rule cannot contain the combination of the Traffic descriptor components IP descriptors and Non-IP descriptors.

After a Policy Control Function (PCF) transmits URSP information to a UE, the UE associates the Application with a PDU session by using a URSP rule included in the URSP information. Clause 6.6.2.3 in the 5G specification TS 23.503 defines a detailed process of associating an Application with a PDU session, which is briefly described as follows:

For an application, the UE determines whether the application matches a traffic descriptor in a URSP rule according to the precedence order of the URSP rules. When a traffic descriptor in a URSP rule matches the application of the UE, the UE further selects a route selection descriptor (hereinafter referred to as RSD) with the highest precedence in the URSP rule. When a valid RSD is found, the UE determines if there is an existing PDU Session that matches all components in the selected RSD. In this case, the matching process is as follows:

For a component which only contains one value (e.g., SSC mode), the value of the PDU session has to be identical to the value specified in the RSD.

For a component which contains a list of values (e.g., Network Slice Selection), the value of the PDU Session has to be identical to one of the values specified in the RSD.

When some component(s) is not present in the RSD, a PDU session is considered matching only if it was established without including the missing component(s) in the PDU session establishment request.

When the RSD includes a Time Window or a Location Criteria, the PDU Session is considered matching only if the PDU session is associated with an RSD that has the same Time Window or a Location Criteria Validity Conditions.

When a matching PDU session exists, the UE associates the application to the existing PDU Session, i.e., route the traffic of the detected application on this PDU Session.

If the UE determines that there is more than one existing PDU session which matches (e.g., the selected RSD only specifies the Network Slice Selection (NSS) component which has a value of, for example, Single Network Slice Selection Assistance Information (S-NSSAI), while there are multiple existing PDU sessions having the same S-NSSAI but different Data Network Names (DNNs), it is up to UE implementation to select one of the PDU sessions. If the UE finds that there is no matching PDU session, the UE establishes a new PDU session according to an RSD (starting from the highest precedence) in the URSP rule. If the new PDU session is established successfully, the UE associates the application with the new PDU session. If the PDU session establishment request is rejected, the UE re-selects a new RSD according to the rejection cause when permitted (for example, if a unit has a plurality of values, this unit takes another value,) and attempts to establish a PDU session. If the PDU session establishment request is still rejected, the UE attempts again using a URSP rule (starting from the highest precedence) and an RSD (starting from the highest precedence) based on precedence. When attempts using all RSDs (in the order of precedence) in a rule have failed, another URSP rule is selected (in the order of precedence), and an RSD in the selected URSP rule is used (in the order of precedence) to attempt to establish a PDU session.

If none of the existing PDU Sessions matches, the UE tries to establish a new PDU Session using the values specified by the selected RSD. If the PDU session establishment request is accepted, the UE associates the application to this new PDU session.

If the PDU session establishment request is rejected, based on the rejection cause, the UE selects another combination of values in the currently selected RSD if any other value for the rejected component in the same RSD can be used. Otherwise, the UE selects the next RSD, which contains a combination of component value which is not rejected by network, in the order of the RSD precedence, if any. If the UE fails to establish a PDU Session with any of the RSDs, it tries other URSP rules in the order of Rule Precedence with matching Traffic descriptors, except the URSP rule with the "match-all" Traffic descriptor, if any.

When the UE's URSP is updated or some event occurs (as defined by TS 24.526), the UE can perform the above matching process again based on the new URSP. In addition, the UE may also re-evaluate the application to PDU session association due to the following reasons:
 (1) periodic re-evaluation based on UE implementation;
 (2) an existing PDU session that is used for routing traffic of an application based on a URSP rule is released;
 (3) the expiration of Time Window in Route Selection Validation Criteria, or UE's location no longer matches the Location Criteria.

If the re-evaluation leads to a change of the application to PDU session association, e.g., the application is to be associated with another PDU session or a new PDU session needs to be established, the UE may enforce such changes in a timely manner based on implementation, e.g., immediately or when UE enters Connection Management-IDLE (CM-IDLE) state.

If the selected Route Selection Descriptor contains a Non-Seamless Offload indication and the UE has established a connection to a Wireless Local Area Network (WLAN)

access, the UE routes the traffic matching the traffic descriptor of the URSP rule via the WLAN access outside of a PDU session.

The IP Descriptors in Table 2 above are defined in the 5G standard R15. In R15, the design of the IP Descriptors is based on uplink data of the UE, because this URSP rule is configured by the network and provided to many UEs. In IP Descriptors, the destination IP address is an address of the server, the destination port number (such as 80, 21, or 443) is a port number through which the server provides services, and the protocol used (such as UDP or TCP) is a protocol when the server provides services. Parameters of data services that the servers on these Data Networks (DNs) can provide can be known by the network, configured in the URSP Rule, and provided to many UEs. If the DL data packet is used as the IP Descriptors, there are the following problems: 1) the situation varies with different UEs, and a UE may not be assigned an IP address; 2) when the UE communicates with the server, the assigned port number is basically randomly assigned, and cannot be determined by the network in advance. In a word, the URSP configures IP Descriptors through configuration parameters of the servers on the DNs that can provide services, and these configurations are used in the uplink data of the UE.

However, because the 5G MBS standard is R17, and the MBS service is a downlink data service, a server in the DN sends downlink data to the UE, where the destination IP address of the downlink data is an IP multicast address (this multicast address is also used to identify this multicast group), the port number may also be configured in advance, and the protocol is generally only UDP. Therefore, if the IP Descriptor of R15 is applied to the data sent by the UE, it cannot be used for 5G MBS, because the UE only has uplink data in IGMP Join, and the IGMP data is only data without a port number, which is not applicable.

Figure 8:
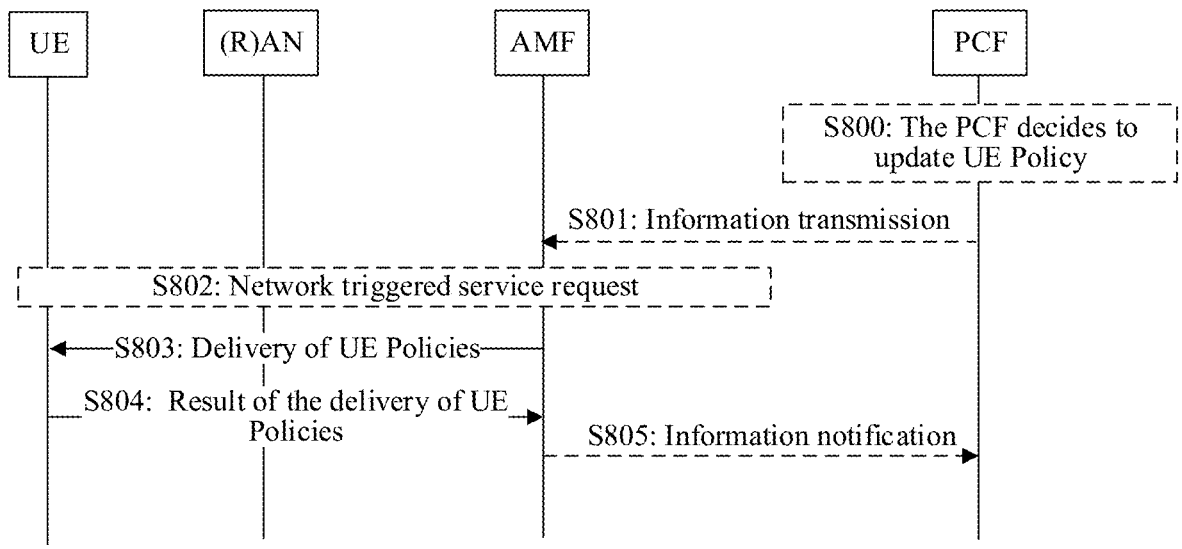
FIG. 8 is a schematic diagram of a UE Policy transmission process.

In addition, the UE policy transmission process defined in existing standards is very complicated, mainly because the number (or content) of UE policies may be very large, and may not be transmitted at a time but require multiple transmission processes. Another complexity is due to the fact that the direct interaction between the UE and the PCF requires the transit of an Access and Mobility Management Function (AMF). The overall UE policy transmission process is given in clause 4.2.4.3 "UE Configuration Update procedure for transparent UE Policy delivery" in the 5G standard TS 23.502, which, as shown in FIG. 8, includes the following steps:

S800, the PCF decides to update UE Policy; S801, the PCF transmits information to the AMF; S802, network triggered service request; S803, the AMF delivers UE Policies to the UE; S804, the UE feeds back a result of the delivery of UE Policies to the AMF; S805, the AMF sends an information notification message to the PCF to notify the result of UE policy update.

Figure 9A:
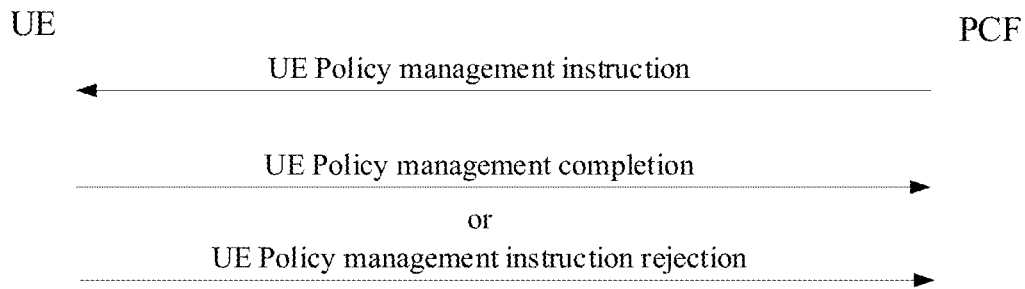
FIG. 9*a* to FIG. 9*c* are schematic diagrams showing three ways of exchanging information between a UE and a PCF.
Figure 9B:
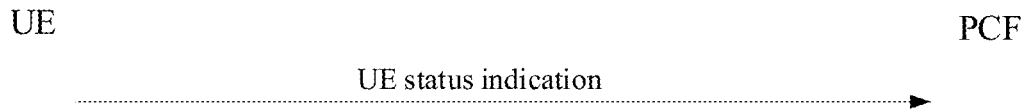
Figure 9C:
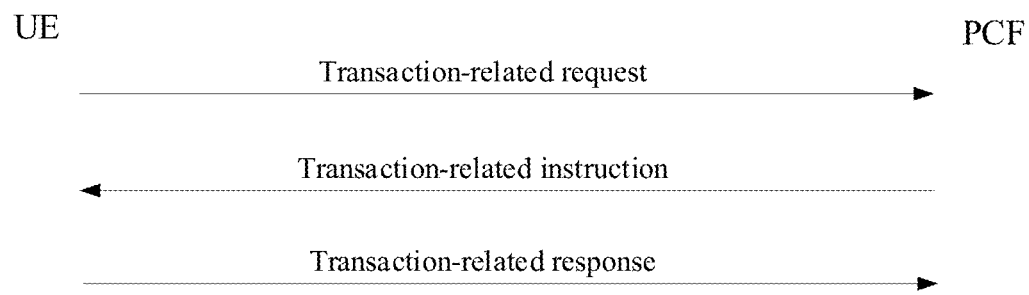

In addition, Annex D of the standard TS 24.501 provides three ways of exchanging information between the UE and the PCF. Specifically, as shown in FIG. 9a to FIG. 9c, in FIG. 9a, the PCF sends a UE policy management instruction to the UE, and the UE feeds back a UE Policy management completion message or a UE Policy management instruction rejection message to the PCF. In FIG. 9b, the UE sends a UE status indication to the PCF; In FIG. 9c, the UE sends a transaction-related request to the PCF, the PCF sends a transaction-related instruction to the UE, and the UE feeds back a transaction-related response to the PCF.

Figure 10:
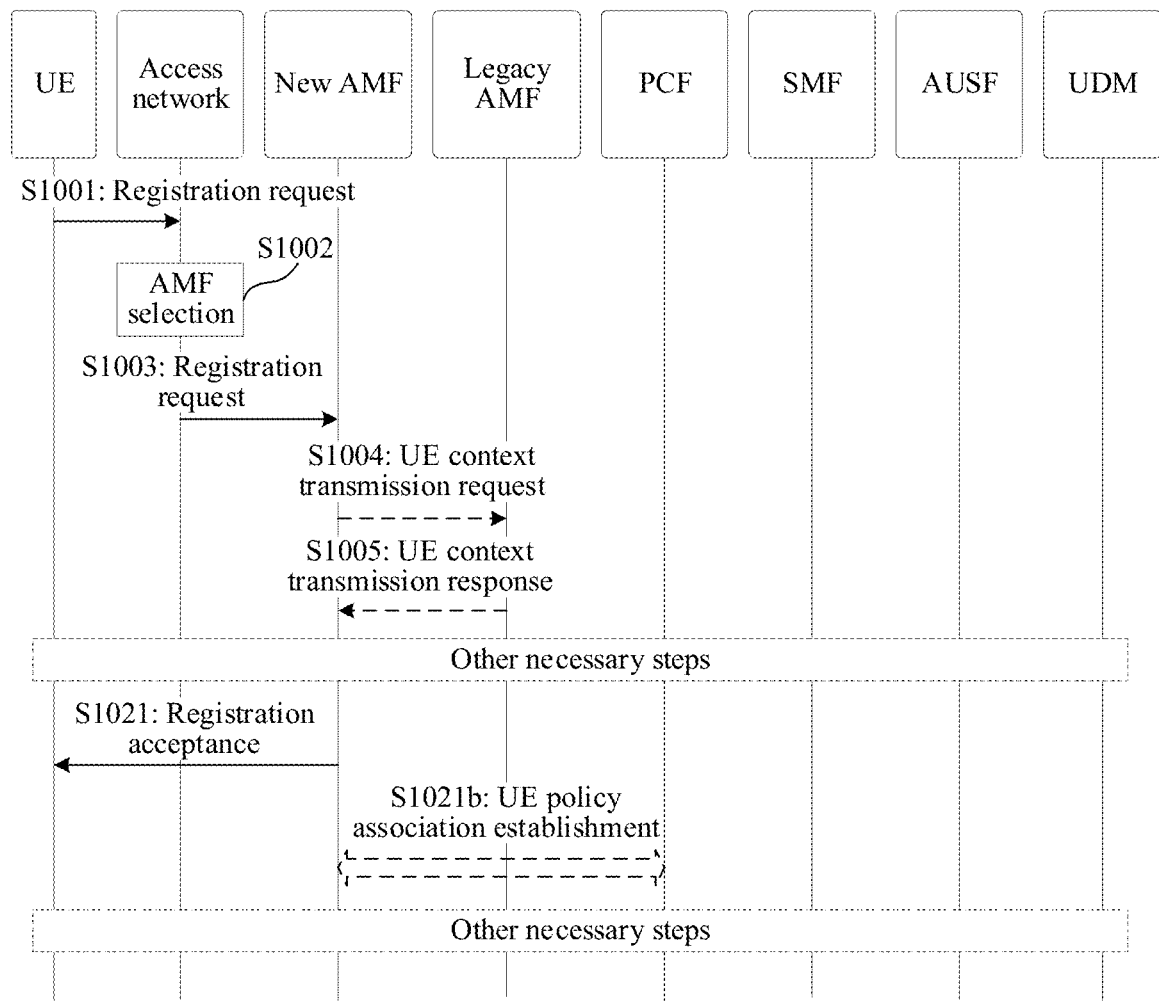
FIG. 10 is a partial flowchart of a UE registration process.

A UE registration process is defined in clause 4.2.2.2 in the standard TS 23.502, which, as shown in FIG. 10, includes the following steps:

S1001, a UE initiates a registration request to an access network; S1002, the access network selects an AMF; S1003, an access network entity initiates a registration request to the new AMF; S1004, the new AMF sends a UE context transmission request to a legacy AMF; S1005, the legacy AMF returns a UE context transmission response to the new AMF; S1021, the AMF sends registration acceptance information to the UE; S1021b, the AMF and the PCF perform a UE policy association establishment process. FIG. 10 also includes some other necessary steps, and reference may be made to clause 4.2.2.2 "Registration procedures" in the 3GPP protocol TS 23.502 for details.

In S1021b, the AMF and the PCF establish a UE Policy Association. In this process, the PCF first transmits the UE Policy to the AMF, and then the AMF transmits the UE Policy to the UE. In addition, when the PCF modifies the UE Policy for various reasons, the PCF initiates the procedure defined in clause 4.2.4.3 "UE Configuration Update procedure for transparent UE Policy delivery" in TS 23.502 to transmit the UE Policy to the UE.

Figure 11:
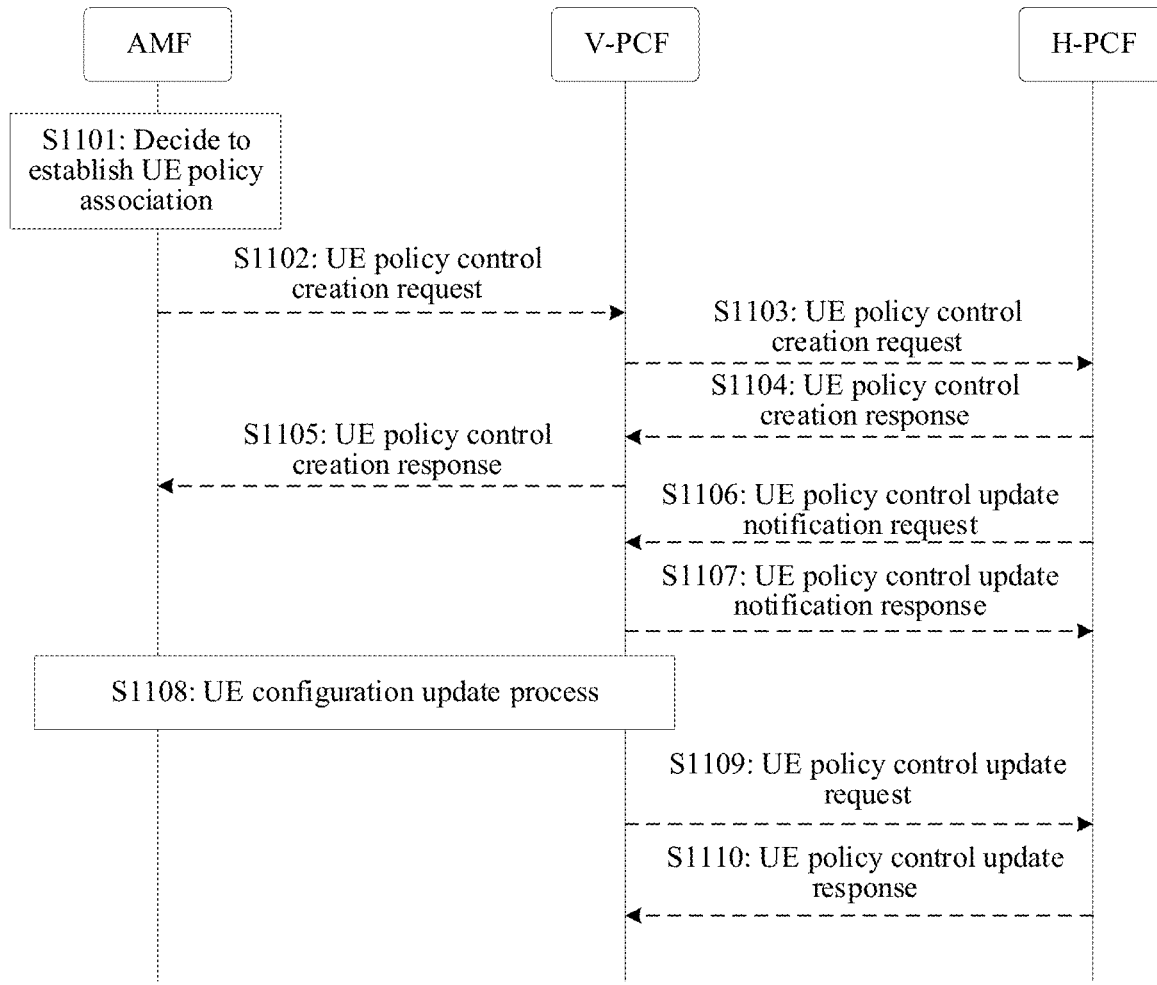
FIG. 11 is a flowchart showing interaction between an H-PCF and an AMF through a V-PCF.

If the UE is in a roaming state, a Home-PCF (H-PCF) interacts with the AMF through a Visited-PCF (V-PCF), which, as shown in FIG. 11, includes the following steps: S1101, the AMF decides to establish a UE policy association; S1102, the AMF sends a UE policy control creation request to the V-PCF; S1103, the V-PCF sends the UE policy control creation request to the H-PCF; S1104, the H-PCF sends a UE policy control creation response to the V-PCF; S1105, the V-PCF sends the UE policy control creation response to the AMF; S1106, the H-PCF sends a UE policy control update notification request to the V-PCF; S1107, the V-PCF sends a UE policy control update notification response to the H-PCF; S1108, the AMF and the V-PCF perform a UE configuration update process; S1109, the V-PCF sends a UE policy control update request to the H-PCF; S1110, the H-PCF sends a UE policy control update response to the V-PCF. For the detailed process of each step in FIG. 11, refer to clause 4.6.11 in the standard TS 23.502.

Figure 12:
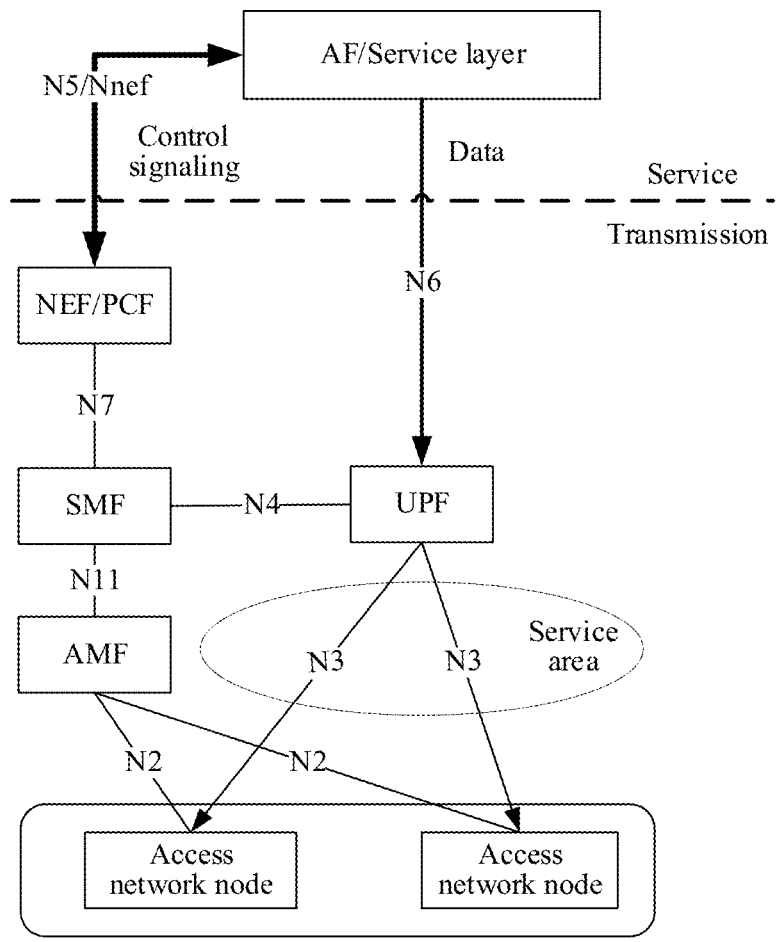
FIG. 12 is a schematic diagram of an MBS system architecture.
Figure 13:
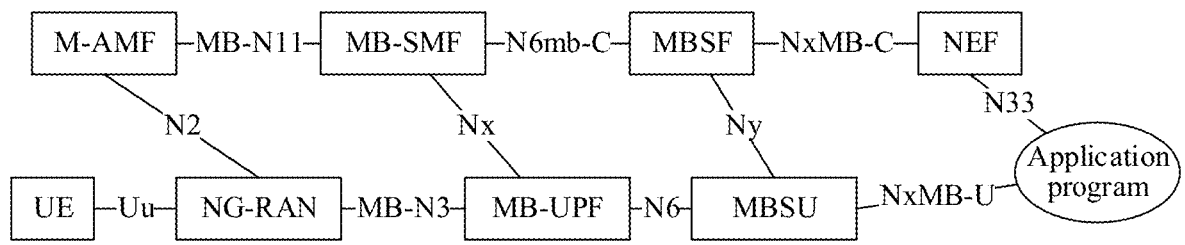
FIG. 13 is a schematic diagram of an MBS system architecture.

In addition, two system architectures as shown in FIG. 12 and FIG. 13 are defined in the latest 5G MBS research reports, where the system architecture shown in FIG. 12 is obtained by adding functions to an existing 5G architecture, that is, supporting 5G MBS services by enhancing the functions and interfaces of the 5G architecture without modifying the existing 5G architecture. The advantage of this architecture is that it can support 5G MBS through software upgrade. The system architecture shown in FIG. 13 is a brand-new architecture, which is obtained by adding some new network function nodes while keeping the existing 5G architecture unchanged. This architecture can minimize the impact on the existing 5G architecture, but some network function nodes may still need to be enhanced, such as NG-RAN (Next Generation Radio Access Network), UDM (Unified Data Management) network element, UDR (User Data Repository) network element, NEF (Network Exposure Function), PCF, etc.

In FIG. 12, SMF represents Session Management Function; UPF represents User Plane Function; and AF represents Application Function. In FIG. 13, MB-UP represents Multicast/Broadcast-UPF; M-AMF represents Multicast-AMF; MB-SMF represents Multicast/Broadcast-SMF; and MBSU represents Multicast/Broadcast Service User Plane. According to the MBS standard, this M-AMF is an AMF dedicated to the MBS service, which can be different from the AMF to which the UE is currently registered in the 5G network.

It can be seen from the above introduction that the MBMS context activation process in the existing standards is cumbersome, which increases the complexity of network deployment and also affects the efficiency of multicast communication. Based on this, this application proposes a new multicast communication solution. The implementation details of the technical solution in the embodiments of this application will be described in detail below.

Figure 14:
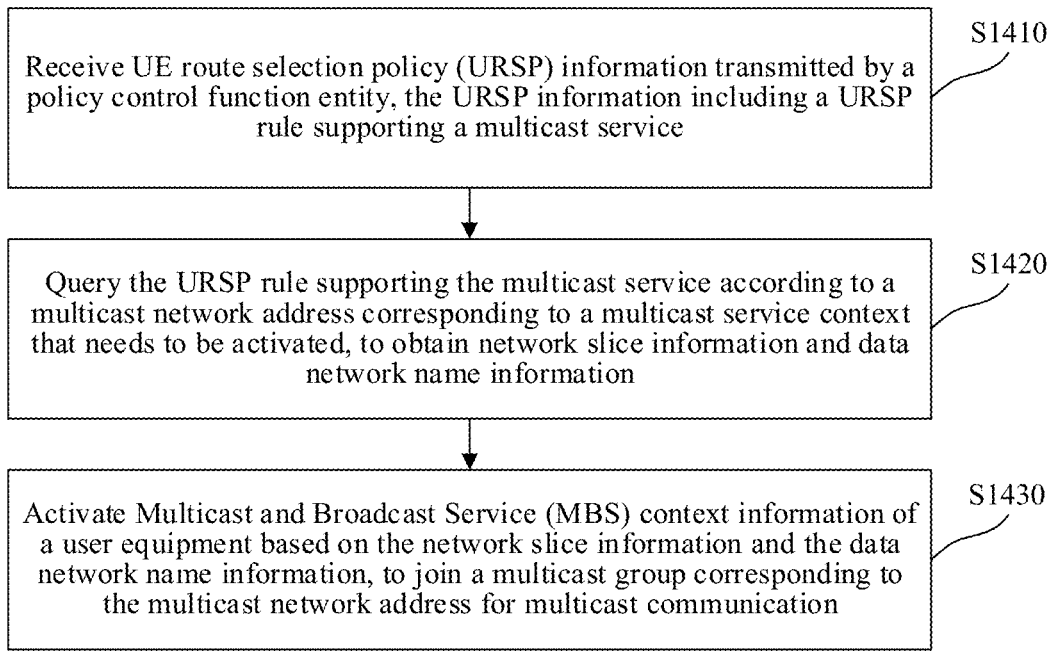
FIG. 14 is a flowchart of a multicast communication method according to an embodiment of this application.

FIG. 14 is a flowchart of a multicast communication method according to an embodiment of this application. The multicast communication method may be executed by a terminal device. Referring to FIG. 14, the multicast communication method includes at least S1410 to S1430, and the details are as follows:

S1410: Receive UE route selection policy (URSP) information transmitted by a policy control function entity, the URSP information including a URSP rule supporting a multicast service.

In an embodiment of this application, the terminal device may receive URSP information sent by a PCF during a registration process. That is, after sending a registration request, the terminal device receives user equipment policy information sent by the PCF, where the user equipment policy information includes the URSP information. In addition, under other conditions, e.g., when a URSP rule is changed, the PCF can transmit the changed URSP rule to the terminal device in a timely manner.

S1420: Query the URSP rule supporting the multicast service according to a multicast network address corresponding to a multicast service context that needs to be activated, to obtain network slice information and data network name information.

In an embodiment of this application, the network slice information may be S-NSSAI, and the data network name is DNN.

In an embodiment of this application, an MBS IP descriptor or Multicast IP descriptor may be added to the URSP rule. In order to distinguish from original IP address descriptors in the URSP rule, the MBS IP descriptor or Multicast IP descriptor is called a first IP address descriptor. If the URSP rule supports the multicast service, the URSP rule includes the first IP address descriptor. The first IP address descriptor is used for describing a destination IP address 2-tuple, and the destination IP address 2-tuple includes the multicast network address and an IGMP protocol above an IP protocol.

In an embodiment of this application, the URSP rule in the URSP information includes a second IP address descriptor for describing a destination IP address 3-tuple, and the destination IP address 3-tuple includes an IP address or IPv6 network prefix, and includes a port number and a protocol identifier of a protocol above an IP protocol. Therefore, the second IP address descriptor can be reused to indicate that it is a URSP rule supporting the multicast service. Specifically, when a destination IP address 3-tuple described by a second IP address descriptor in a URSP rule includes the multicast network address and an IGMP protocol and does not include a port number, the URSP rule is determined as the URSP rule supporting the multicast service.

In an embodiment of this application, because the URSP rule in the URSP information includes connection capabilities information, a code value for indicating multicast communication may be added to the connection capabilities information. Specifically, when a value of connection capabilities information in a URSP rule is a code value indicating multicast communication and a destination IP address 3-tuple described by an IP address descriptor in the URSP rule includes the multicast network address and an IGMP protocol and does not include a port number, the URSP rule is determined as the URSP rule supporting the multicast service.

In an embodiment of this application, the URSP rule supporting the multicast service may include connection capabilities information, and a first IP address descriptor for an MBS or multicast service; the first IP address descriptor is used for describing a destination IP address 2-tuple, and the destination IP address 2-tuple includes the multicast network address and an IGMP protocol above an IP protocol; and a value of the connection capabilities information indicates a code value of multicast communication.

In an embodiment of this application, the URSP rule in the URSP information includes connection capabilities information, and a value of the connection capabilities information includes a code value used for indicating multicast communication or broadcast communication, wherein, when a value of a connection capabilities information in a URSP rule is a code value indicating multicast communication, the URSP rule is determined as a URSP rule supporting the multicast service through downlink transmission.

In an embodiment of this application, a third IP address descriptor for an MBS or multicast service or broadcast service may be added to the URSP rule, the third IP address descriptor is used for describing a downlink destination IP address 3-tuple, and the downlink destination IP address 3-tuple includes a multicast network address or a broadcast network address and includes a port number and a protocol identifier of a protocol above an IP protocol, wherein, when a downlink destination IP address 3-tuple described by a third IP address descriptor in a URSP rule includes a multicast network address, the URSP rule is determined as the URSP rule supporting the multicast service through downlink transmission.

In an embodiment of this application, because the URSP rule in the URSP information includes connection capabilities information, a code value for indicating multicast communication or broadcast communication may be added to the connection capabilities information. When a value of connection capabilities information in a URSP rule is a code value indicating multicast communication and a third IP address descriptor for an MBS or multicast service or broadcast service in the URSP rule includes a multicast network address, a port number, and a protocol identifier of a protocol above an IP protocol, the URSP rule is determined as the URSP rule supporting the multicast service through downlink transmission.

Still referring to FIG. 14, S1430: Activate Multicast and Broadcast Service (MBS) context information of a user equipment based on the network slice information and the data network name information, to join a multicast group corresponding to the multicast network address for multicast communication.

In an embodiment of this application, a PDU session establishment request may be initiated based on the network slice information and the data network name information to establish a PDU session, and then the MBS context information of the user equipment is activated based on the established PDU session. Specifically, an Internet Group Management Protocol (IGMP) data packet including the multicast network address may be transmitted to a UPF by using a network address assigned during establishment of the PDU session as a source address, where the IGMP data packet is used for instructing to activate the MBS context information of the user equipment.

In an embodiment of this application, if the IGMP data packet adopts the IGMPv1 protocol or the IGMPv2 protocol, the multicast network address is a destination address of the IGMP data packet; and if the IGMP data packet adopts the IGMPv3 protocol, the multicast network address is located in a protocol field in the IGMP data packet.

In an embodiment of this application, for a scenario where the mobile communication system architecture shown in FIG. 12 is used to perform a multicast and broadcast service, the UE may transmit the IGMP data packet to the UPF in the mobile communication system architecture; and for a scenario where the new MBS system architecture shown in FIG. 13 is used, the UE may transmit the IGMP data packet to a user plane function entity (i.e., MB-UPF) configured to perform a multicast and broadcast service in the new MBS system architecture.

In an embodiment of this application, when it is determined based on the network slice information and the data network name information that a matching PDU session already exists, the MBS context information of the user equipment is activated directly based on the matching PDU session, that is, there is no need to initiate a PDU session establishment request.

In an embodiment of this application, after acquiring the network slice information and the data network name information, the UE may not establish a PDU session, but use the MBS Multicast service by wireless optimization. The specific process will be described in detail below.

In the technical solution of the embodiment shown in FIG. 14, the multicast communication method of the embodiments of this application is illustrated from the perspective of a terminal device. The technical solution of the embodiments of this application will be further illustrated below from the perspective of a session management functional entity.

Figure 15:
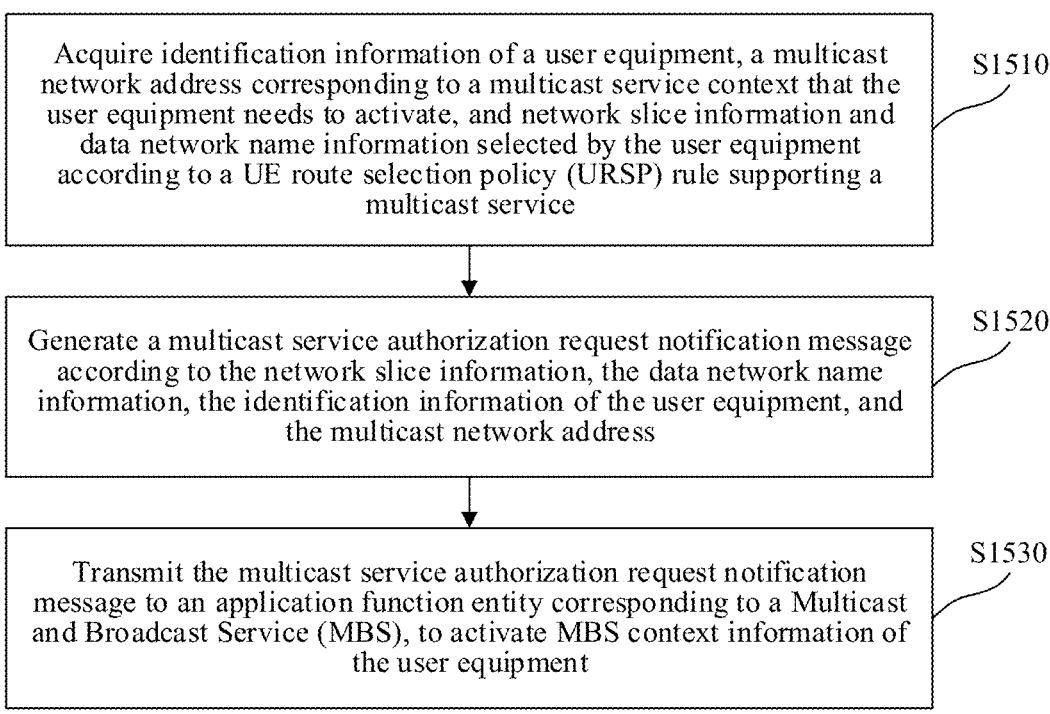
FIG. 15 is a flowchart of a multicast communication method according to an embodiment of this application.

FIG. 15 is a flowchart of a multicast communication method according to an embodiment of this application. The multicast communication method may be executed by a session management function entity (SMF). Referring to FIG. 15, the multicast communication method includes at least S1510 to S1530, and the details are as follows:

S1510: Acquire identification information of a user equipment, a multicast network address corresponding to a multicast service context that the user equipment needs to activate, and network slice information and data network name information selected by the user equipment according to a UE route selection policy (URSP) rule supporting a multicast service.

In an embodiment of this application, a session report message transmitted by a user plane function entity may be received; the multicast network address is acquired according to the session report message; and the network slice information, the data network name information, and the identification information of the user equipment are acquired according to information used during establishment of a protocol data unit (PDU) session of the user equipment. Certainly, the network slice information, the data network name information, and the identification information of the user equipment may also be acquired according to uplink Non-Access Stratum (NAS) transport information of the user equipment.

S1520: Generate a multicast service authorization request notification message according to the network slice information, the data network name information, the identification information of the user equipment, and the multicast network address.

S1530: Transmit the multicast service authorization request notification message to an application function entity corresponding to a Multicast and Broadcast Service (MBS), to activate MBS context information of the user equipment.

In an embodiment of this application, for a scenario where the mobile communication system architecture shown in FIG. 12 is used to perform a multicast and broadcast service, the application function entity corresponding to the MBS may be determined according to the network slice information, the data network name information, the identification information of the user equipment, and the multicast network address; and the multicast service authorization request notification message is transmitted directly to the application function entity, or the multicast service authorization request notification message is transmitted to a network exposure function entity, so that the network exposure function entity forwards the multicast service authorization request notification message to the application function entity. In this embodiment, the SMF determines the application function entity corresponding to the MBS, and then sends the multicast service authorization request notification message to the determined application function entity directly or through an NEF.

In an embodiment of this application, for a scenario where the mobile communication system architecture shown in FIG. 12 is used to perform a multicast and broadcast service, the multicast service authorization request notification message may be transmitted to a network exposure function entity, so that the network exposure function entity determines the application function entity corresponding to the MBS according to information included in the multicast service authorization request notification message, and transmits the multicast service authorization request notification message to the application function entity. In this embodiment, the SMF sends the multicast service authorization request notification message to an NEF, and the NEF determines the application function entity corresponding to the MBS, and then sends the multicast service authorization request notification message to the determined application function entity.

In an embodiment of this application, for a scenario where the mobile communication system architecture shown in FIG. 12 is used to perform a multicast and broadcast service, after the multicast service authorization request notification message is transmitted to the application function entity corresponding to the MBS, if a multicast service session start request from the application function entity is received, the multicast service session is activated based on the multicast service session start request.

In an embodiment of this application, the process of receiving the multicast service session start request from the application function entity by the SMF may include receiving the multicast service session start request directly transmitted by the application function entity.

In an embodiment of this application, the process of receiving the multicast service session start request from the application function entity by the SMF may include receiving a multicast service session start request from the application function entity that is forwarded by an NEF. Because different UEs may select different SMFs, there may be multiple SMFs to which the multicast service session start request needs to be transmitted. In this case, the multicast service session start request transmitted by the application function entity to the NEF includes a list of identifiers of session management function entities to which the multicast service session start request is to be transmitted, or the application function entity transmits a plurality of multicast service session start requests to the NEF, each multicast service session start request including an identifier of one session management function entity to which the multicast service session start request is to be transmitted.

In an embodiment of this application, for a scenario where the new MBS system architecture shown in FIG. 13 is used, the MB-SMF may transmit the multicast service authorization request notification message to the application function entity corresponding to the MBS. Specifically, the MB-SMF may determine a corresponding multicast and broadcast service function (MBSF) according to the network slice information, the data network name information, the identification information of the user equipment, and the multicast network address; and transmit the multicast service authorization request notification message to the MBSF, so that the MBSF forwards the multicast service authorization request notification message to the application function entity. For the process of forwarding the multicast service authorization request notification message to the application function entity by the MBSF, refer to FIG. 16.

Figure 16:
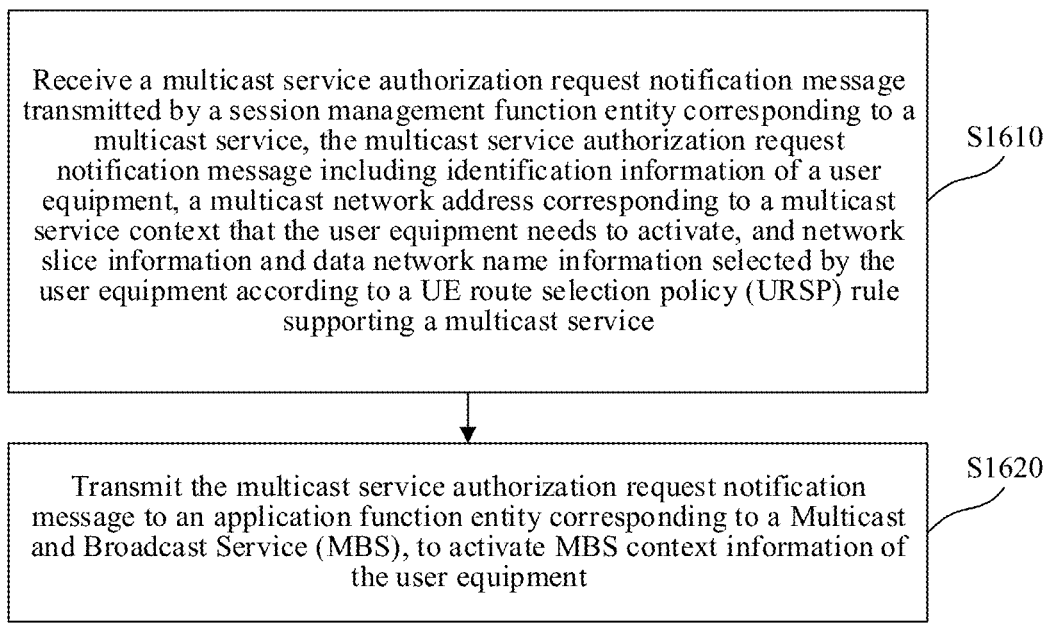
FIG. 16 is a flowchart of a multicast communication method according to an embodiment of this application.

FIG. 16 is a flowchart of a multicast communication method according to an embodiment of this application. The multicast communication method is applicable to an application scenario where the new MBS system architecture shown in FIG. 13 is used to perform multicast communication, and may be specifically executed by an MBSF. Referring to FIG. 16, the multicast communication method includes at least S1610 to S1620, and the details are as follows:

S1610: Receive a multicast service authorization request notification message transmitted by an SMF corresponding to a multicast service, the multicast service authorization request notification message including identification information of a user equipment, a multicast network address corresponding to a multicast service context that the user equipment needs to activate, and network slice information and data network name information selected by the user equipment according to a UE route selection policy (URSP) rule supporting a multicast service.

S1620: Transmit the multicast service authorization request notification message to an application function entity corresponding to a Multicast and Broadcast Service (MBS), to activate MBS context information of the user equipment.

In an embodiment of this application, the process of transmitting the multicast service authorization request notification message to the application function entity corresponding to the MBS by the MBSF may include: determining the application function entity corresponding to the MBS according to information included in the multicast service authorization request notification message; and then transmitting the multicast service authorization request notification message directly to the application function entity, or transmitting the multicast service authorization request notification message to an NEF, so that the NEF forwards the multicast service authorization request notification message to the application function entity. In this embodiment, the MBSF determines the application function entity corresponding to the MBS, and then sends the multicast service authorization request notification message to the determined application function entity directly or through an NEF.

In an embodiment of this application, the process of transmitting the multicast service authorization request notification message to the application function entity corresponding to the MBS by the MBSF may include: transmitting the multicast service authorization request notification message to an NEF, so that the NEF determines the application function entity corresponding to the MBS according to information included in the multicast service authorization request notification message, and transmits the multicast service authorization request notification message to the application function entity. In this embodiment, the MBSF sends the multicast service authorization request notification message to an NEF, and the NEF determines the application function entity corresponding to the MBS, and then sends the multicast service authorization request notification message to the determined application function entity.

In an embodiment of this application, after transmitting the multicast service authorization request notification message to the application function entity corresponding to the MBS, the MBSF may further receive a multicast service session start request from the application function entity, and then activate the multicast service session based on the multicast service session start request.

In an embodiment of this application, the process of receiving the multicast service session start request from the application function entity by the MBSF may include receiving the multicast service session start request directly transmitted by the application function entity.

In an embodiment of this application, the process of receiving the multicast service session start request from the application function entity by the MBSF may include receiving a multicast service session start request from the application function entity that is forwarded by an NEF. Because different UEs may select different MBSFs, there may be multiple MBSFs to which the multicast service session start request needs to be transmitted. In this case, the multicast service session start request transmitted by the application function entity to the NEF includes a list of identifiers of MBSFs to which the multicast service session start request is to be transmitted, or the application function entity transmits a plurality of multicast service session start requests to the NEF, each multicast service session start request including an identifier of one MBSF to which the multicast service session start request is to be transmitted.

The technical solutions of the embodiments of this application have been described above from the perspectives of the terminal device, the SMF, and the MBSF, respectively. The implementation details of the technical solutions of the embodiments of this application will be described in detail below from the perspective of interaction between entities.

The technical solutions of the embodiments of this application mainly aim to enable a UE in a 5G (or even future generation such as 6G) communication system to correctly select an APN for a MBMS multicast service and activate an MBMS multicast context at a time. The core idea is to configure the UE's MBMS Policy through the 5G UE Policy. Through this MBMS Policy, the UE in 5G can select the corresponding S-NSSAI and DNN according to different IP multicast addresses, and create an MBMS UE context (or PDU Session) by using the S-NSSAI and DNN.

In Embodiment 1a of this application, an item may be added in the URSP Rule shown in Table 2 to obtain the following Table 3:

TABLE 3

| Information name | Description | Category | PCF permitted to modify in a UE context | Scope |
|---|---|---|---|---|
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| MBS (or Multicast) IP Descriptors (NOTE 6) | Destination IP 2 tuples (An IPv4 or IPv6 Multicast Address, IGMP protocol above IP) | Optional | Yes | UE context |
| IP descriptors (NOTE 5) (NOTE 6) | Destination IP 3 tuple(s) (IP address or IPv6 network prefix, port number, protocol ID of the protocol above IP) | Optional | Yes | UE context |
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.
(NOTE 6):
If destination IP is an IPv4 or IPv6 multicast address and Protocol ID is IGMP, the MBS IP descriptors is used, otherwise, the IP descriptor is used.

As shown in Table 3, an item, i.e., MBS (or Multicast) IP Descriptors, is added to the URSP Rule, and a corresponding description is also added (where bolded and underlined contents in Table 3 are newly added contents). The MBS (or Multicast) IP Descriptors is used to describe a destination IP 2-tuple, where the destination IP 2-tuple contains an IPv4 or IPv6 multicast address and an IGMP protocol above IP. By Embodiment 1a, the activation of a multicast context can be implemented based on an IGMP Join data packet.

In Embodiment 1b of this application, a value and function description may be added in the URSP Rule shown in Table 2 to obtain the following Table 4:

TABLE 4

| Information name | Description | Category | PCF permitted to modify in a UE context | Scope |
|---|---|---|---|---|
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| IP descriptors (NOTE 5) | Destination IP 3 tuple(s) (IP address or IPv6 network prefix, port number, protocol ID of the protocol above IP) | Optional | Yes | UE context |

TABLE 4-continued

| Information name | Description | Category | PCF permitted to modify in a UE context | Scope |
|---|---|---|---|---|
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", "MBS/Multicast/MBMS", etc., are defined in TS 24.526 [19]. More than one connection capabilities value can be provided.
(NOTE 5):
A URSP rule cannot contain the combination of the Traffic descriptor components IP descriptors and Non-IP descriptors.

As shown in Table 4 (where bolded and underlined contents in Table 4 are newly added contents), by adding a value of Connection Capabilities, the value of Connection Capabilities in the URSP can be used to directly indicate that it is used for the Multicast service of MBS. Because Connection Capabilities is defined in the standard TS 24.526, it is necessary to add a new 8-bit code value, for example, "00001001", to "Connection Capabilities" in TS 24.526 to indicate multicast communication. The name corresponding to the new code value may be any one of MBS, Multicast, or MBMS, or may be any other name used to represent multicast communication.

In Embodiment 1b, if a value indicated by "Connection Capabilities" in a URSP Rule is "MBS/Multicast/MBMS", the destination IP address in IP Descriptors is a multicast address (IPv4 or IPv6), the Protocol ID is IGMP, and there is no Port Number (because the IGMP protocol does not have a port number), it may be determined that the URSP rule is a URSP rule supporting multicast communication.

In Embodiment 1c of this application, an item as well as a value and function description of "Connection Capabilities" may be added in the URSP rule shown in Table 2 to obtain the following Table 5:

TABLE 5

| Information name | Description | Category | PCF permitted to modify in a UE context | Scope |
|---|---|---|---|---|
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| MBS (or Multicast) IP Descriptors (NOTE 6) | Destination IP 2 tuples (An IPv4 or IPv6 Multicast Address, IGMP protocol above IP) | Optional | Yes | UE context |
| IP descriptors (NOTE 5) (NOTE 6) | Destination IP 3 tuple(s) (IP address or IPv6 network prefix, port number, protocol ID of the protocol above IP) | Optional | Yes | UE context |
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |

TABLE 5-continued

| Information name | Description | Category | PCF permitted to modify in a UE context | Scope |
| --- | --- | --- | --- | --- |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", "MBS/Multicast/MBMS", etc., are defined in TS 24.526 [19]. More than one connection capabilities value can be provided.
(NOTE 5):
A URSP rule cannot contain the combination of the Traffic descriptor components IP descriptors and Non-IP descriptors.
(NOTE 6):
If destination IP is an IPv4 or IPv6 multicast address and Protocol ID is IGMP, the MBS IP descriptors is used, otherwise, the IP descriptor is used.

As shown in Table 5 (where bolded and underlined contents in Table 5 are newly added contents), an item, i.e., MBS (or Multicast) IP Descriptors, is added to the URSP rule, and a corresponding description is added. The MBS (or Multicast) IP Descriptors is used to describe a destination IP 2-tuple, where the destination IP 2-tuple contains an IPv4 or IPv6 multicast address and an IGMP protocol above IP. In addition, similar to Embodiment 1b, by adding a value of Connection Capabilities, the value of Connection Capabilities in the URSP can be used to directly indicate that it is used for the Multicast service of MBS.

Embodiment 1c is a combination of Embodiment 1a and Embodiment 1b. In this case, if a value indicated by "Connection Capabilities" in a URSP Rule is "MBS/Multicast/MBMS", and a destination IP 2-tuple described in MBS (or Multicast) IP Descriptors contains an IPv4 or IPv6 multicast address and an IGMP protocol above IP, it may be determined that the URSP rule is a URSP rule supporting multicast communication.

In Embodiment 2a of this application, a value and function description may be added in the URSP Rule shown in Table 2 to obtain the following Table 6:

TABLE 6

| Information name | Description | Category | PCF permitted to modify in a UE context | Scope |
| --- | --- | --- | --- | --- |
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| IP descriptors (NOTE 5) (NOTE 6) | Destination IP 3 tuple(s) (IP address or IPv6 network prefix, port number, protocol ID of the protocol above IP) | Optional | Yes | UE context |
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |

TABLE 6-continued

| Information name | Description | Category | PCF permitted to modify in a UE context | Scope |
|---|---|---|---|---|
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", "MBS/Multicast/MEMS/Broadcast", etc., are defined in TS 24.526 [19]. More than one connection capabilities value can be provided.
(NOTE 5):
A URSP rule cannot contain the combination of the Traffic descriptor components IP descriptors and Non-IP descriptors.
(NOTE 6):
If the value of Connection Capabilities is "MBS" or "Multicast" or "MBMS" or "Broadcast", the IP descriptors is used for the DL IP packets, otherwise, the IP descriptor is used for the UL IP packets.

As shown in Table 6 (where bolded and underlined contents in Table 6 are newly added contents), a value of Connection Capabilities is added. Because Connection Capabilities is defined in the standard TS 24.526, it is necessary to add a new 8-bit code value, for example, "00001001", to "Connection Capabilities" in TS 24.526 to indicate multicast communication/broadcast communication. The name corresponding to the new code value may be any one of MBS, Multicast, or MBMS, or may be any other name used to represent multicast communication/broadcast communication. Compared with Embodiment 1b, in Embodiment 2a, a value "broadcast" of Connection Capabilities is added. Therefore, Embodiment 1b is a solution based on IGMP Join and can only support multicast, while Embodiment 2a is implemented based on data transmission, and is not only applicable to multicast communication, but also can implement broadcast transmission. If broadcast transmission is used, the UE neither needs to establish an MBS context nor needs to send an IGMP data packet.

Based on Embodiment 2a, if a value indicated by "Connection Capabilities" in a URSP Rule is "MBS/Multicast/MBMS", it may be determined that the URSP rule is a URSP rule supporting multicast communication through downlink transmission.

In Embodiment 2b of this application, an item may be added in the URSP Rule shown in Table 2 to obtain the following Table 7:

TABLE 7

| Information name | Description | Category | PCF permitted to modify in a UE context | Scope |
|---|---|---|---|---|
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| IP descriptors (NOTE 5) (NOTE 6) | Destination IP 3 tuple(s) (IP address or IPv6 network prefix, port number, protocol ID of the protocol above IP) | Optional | Yes | UE context |
| MBS (or multicast/ broadcast) IP descriptors (NOTE 6) | Down Link Destination IP 3 tuple(s) (IPv4 Multicast/broadcast address or IPv6 multicast/broadcast address, port number, protocol ID of the protocol above IP) | Optional | Yes | UE context |
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |

TABLE 7-continued

| Information name | Description | Category | PCF permitted to modify in a UE context | Scope |
|---|---|---|---|---|
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", etc., are defined in TS 24.526 [19]. More than one connection capabilities value can be provided.
(NOTE 5):
A URSP rule cannot contain the combination of the Traffic descriptor components IP descriptors and Non-IP descriptors.
(NOTE 6):
If an IP address is multicast or broadcast IPv4 or IPv6 address, the MBS IP Descriptor is used.

As shown in Table 7 (where bolded and underlined contents in Table 7 are newly added contents), an item, i.e., MBS (or Multicast/Broadcast) IP Descriptors, is added to the URSP rule, and a corresponding description is added. The MBS (or Multicast/Broadcast) IP Descriptors is used to describe a downlink destination IP 3-tuple (IPv4 Multicast/broadcast address or IPv6 multicast/broadcast address, port number, protocol ID of the protocol above IP). If an IP address is an IPv4 or IPv6 multicast or broadcast address, the MBS IP Descriptors is used. By Embodiment 2b, the multicast service can be implemented based on downlink data transmission.

In Embodiment 2c of this application, an item may be added in the URSP Rule shown in Table 2 to obtain the following Table 8:

TABLE 8

| Information name | Description | Category | PCF permitted to modify in a UE context | Scope |
|---|---|---|---|---|
| Rule Precedence | Determines the order the URSP rule is enforced in the UE | Mandatory (NOTE 1) | Yes | UE context |
| Traffic descriptor | This part defines the Traffic descriptor components for the URSP rule | Mandatory (NOTE 3) | | |
| Application descriptors | It consists of OSId and OSAppId(s) (NOTE 2) | Optional | Yes | UE context |
| IP descriptors (NOTE 5) (NOTE 6) | Destination IP 3 tuple(s) (IP address or IPv6 network prefix, port number, protocol ID of the protocol above IP) | Optional | Yes | UE context |
| MBS (or multicast/ broadcast) IP descriptors (NOTE 6) | Down Link Destination IP 3 tuple(s) (IPv4 Multicast/broadcast address or IPv6 multicast/broadcast address, port number, protocol ID of the protocol above IP) | Optional | Yes | UE context |
| Domain descriptors | (Destination FQDN(s) or a regular expression as a domain name matching criteria) | Optional | Yes | UE context |
| Non-IP descriptors (NOTE 5) | Descriptor(s) for destination information of non-IP traffic | Optional | Yes | UE context |
| Data Network Name (DNN) | This is matched against the DNN information provided by the application | Optional | Yes | UE context |
| Connection Capabilities | This is matched against the information provided by a UE application when it requests a network connection with certain capabilities (NOTE 4) | Optional | Yes | UE context |

TABLE 8-continued

| Information name | Description | Category | PCF permitted to modify in a UE context | Scope |
|---|---|---|---|---|
| List of Route Selection Descriptors | A list of Route Selection Descriptors | Mandatory | | |

(NOTE 1):
Rules in a URSP shall have different precedence values.
(NOTE 2):
The information is used to identify the Application(s) that is(are) running on the UE's operating system (OS). The OSId does not include an OS version number. The OSAppId does not include a version number for the application.
(NOTE 3):
At least one of the Traffic descriptor components shall be present.
(NOTE 4):
The format and some values of Connection Capabilities, e.g., "ims", "mms", "internet", "MBS/Multicast/MBMS/Broadcast", etc., are defined in TS 24.526 [19]. More than one connection capabilities value can be provided.
(NOTE 5):
A URSP rule cannot contain the combination of the Traffic descriptor components IP descriptors and Non-IP descriptors.
(NOTE 6):
If the value of Connection Capabilities is "MBS" or "Multicast" or "MBMS" or "Broadcast", the MBS IP descriptors is used, otherwise, the IP descriptor is used for the UL IP packets.

As shown in Table 8 (where bolded and underlined contents in Table 8 are newly added contents), a value of Connection Capabilities is added. Because Connection Capabilities is defined in the standard TS 24.526, it is necessary to add a new 8-bit code value, for example, "00001001", to "Connection Capabilities" in TS 24.526 to indicate multicast communication/broadcast communication. The name corresponding to the new code value may be any one of MBS, Multicast, or MBMS, or may be any other name used to represent multicast communication/broadcast communication. In addition, an item, i.e., MBS (or Multicast/Broadcast) IP Descriptors, is added to the URSP rule, and a corresponding description is added. The MBS (or Multicast/Broadcast) IP Descriptors is used to describe a downlink destination IP 3-tuple (IPv4 Multicast/broadcast address or IPv6 multicast/broadcast address, port number, protocol ID of the protocol above IP). If the value of Connection Capabilities is "MBS" or "Multicast" or "MBMS" or "Broadcast", the MBS IP descriptors is used, otherwise, the IP descriptor is used for the UL IP packets. By Embodiment 2c, the multicast service can also be implemented based on downlink data transmission.

In an embodiment of this application, based on the URSP rules in the foregoing embodiments, when the UE is in the registration process, the AMF and the PCF establish a UE Policy Association. In this process, the PCF transmits a UE Policy to the UE, where the UE Policy contains the URSP rules supporting MBS Multicast proposed in the embodiments of this application. For example, in S1021b in FIG. 10 and S1106 and S1108 in FIG. 11, the URSP rules supporting MBS Multicast proposed in the embodiments of this application are included. Based on these URSP rules, a PDU session of MBS can be established through one process in the embodiments of this application.

Figure 17:
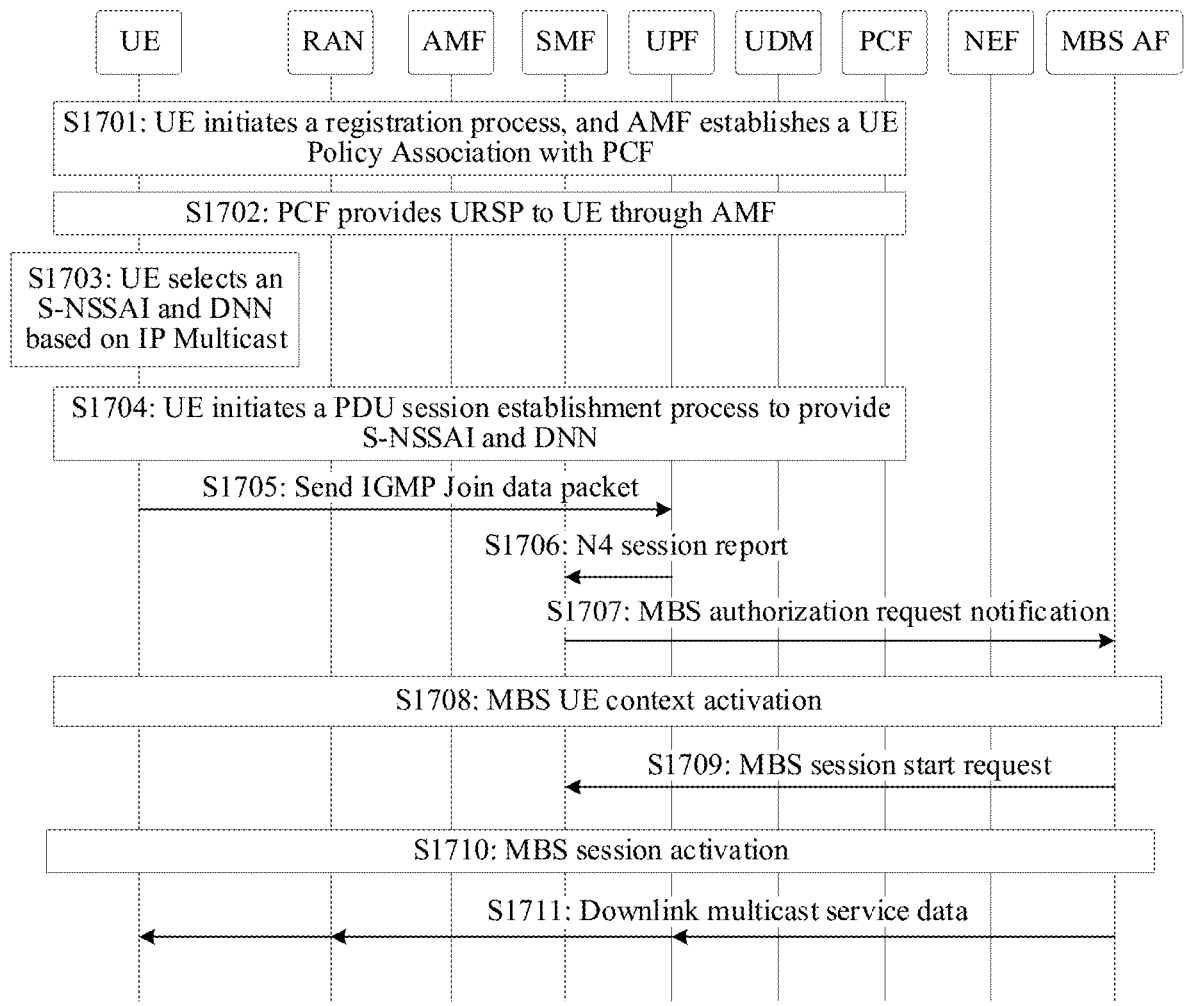
FIG. 17 is a flowchart of a URSP-based multicast communication method according to an embodiment of this application.

FIG. 17 shows a URSP-based multicast communication method according to an embodiment of this application. The multicast communication method is applicable to the system architecture shown in FIG. 12, and mainly includes the following steps:

S1701: A UE initiates a registration process, which is defined in clause 4.2.2.2 "Registration procedures" in the standard TS 23.502, and similar to S1021b shown in FIG. 10, an AMF establishes a UE Policy Association with a PCF.

S1702: According to clause 4.16.11 in the standard TS 23.502, in the process of establishing the UE Policy Association, the PCF pushes a URSP rule to the UE. The URSP rule includes the URSP rules containing MBS Multicast information in the above-mentioned Embodiment 1a, Embodiment 1b, Embodiment 1c, Embodiment 2a, Embodiment 2b, and Embodiment 2c.

S1703: When the UE needs to activate a multicast service context corresponding to an IP Multicast address, the UE queries a relevant URSP rule according to the IP Multicast address to obtain S-NSSAI and DNN information contained in the Route Selection Descriptor. Note: The IP Multicast address may be an IPv4 multicast address or an IPv6 multicast address.

S1704: According to the S-NSSAI and DNN obtained in S1703, the UE initiates a PDU session establishment process, that is, sends a PDU Session Establishment Request, where the request includes the S-NSSAI and DNN information obtained in S1703, etc.; then an AMF selects an SMF according to the S-NSSAI and DNN information, the SMF selects a UPF, and then the SMF assigns an IP address to the UE. This process is defined in clause 4.3.2 "PDU Session Establishment" of the standard TS 23.502.

S1705: After a PDU session is established, the UE sends an IGMP Join data packet to the UPF on the user plane by using the IP address assigned in S1704 as a source address, where the IGMP data packet is an IGMP Membership Report message. An IP Multicast address contained in the IGMP Join data packet is the IP Multicast address when S-NSSAI and DNN are selected in S1703. Note: If the IGMPv1/v2 protocol is used, the destination IP address of this IP packet is the IP multicast address; if the IGMPv3 protocol is used, the IP multicast address is in the IGMP protocol part of the IP packet.

S1706: The UPF reports the multicast address information of the IGMP packet to the SMF through an N4 Session Report message after detecting the IGMP Join data packet according to a Packet Detection Rule (PDR) configuration of the SMF.

S1707: The SMF determines an MBS AF according to the information (S-NSSAI, DNN, UE ID, IP Multicast Address, etc.) involved in the establishment of the PDU Session in S1704, and then sends an MBS authorization request notification (Nsmf_MBS Authorization Request Notify) message to the MBS AF, where the MBS authorization request notification message includes S-NSSAI, DNN, UE ID, IP Multicast Address, UE Location, etc.

The UE ID may be a Generic Public Subscription Identifier (GPSI) or a Subscription Permanent Identifier (SUPI). The UE Location may be a Common Gateway Interface (CGI), a Tracking Area Identity (TAD, a Globally Unique AMF Identifier (GUAMI), etc.

In an embodiment of this application, the SMF may not select an MBS AF in advance, but send the Nsmf_MBS Authorization Request Notify message to an NEF; then the NEF determines an MBS AF according to the parameters S-NSSAI, DNN, UE ID, IP Multicast Address, and the like in the message and so on to, and sends the Nnef_MBS Authorization Request Notify message to the MBS AF.

S1708: Activate an MBS UE context of the entire UE in a 5G system.

S1709: Before sending multicast data to the same IP multicast address in S1703, the MBS AF sends an MBS session start request (Nsmf_MBS Session Start Request) to the SMF, where the MBS session start request includes IP Multicast, TMGI, QoS, time to multicast data transfer, estimated session duration, session ID, etc.

In an embodiment of this application, when an NEF is used, the MBS AF first sends a Nnef_MBS Session Start Request (including a list of SMF IDs, IP Multicast, TMGI, QoS, time to multicast data transfer, estimated session duration, session ID) message, and then the NEF sends a Nsmf_MBS Session Start Request (including IP Multicast, TMGI, QoS, time to multicast data transfer, estimated session duration, session ID) message to each SMF.

Note: Because there are many UEs accessing the MBS Multicast service identified by the same IP Multicast Address, it is possible that different SMFs are selected by different UEs. In this case, the MBS AF needs to send a Nsmf_MBS Session Start Request message to all these SMFs. In this case, if an NEF is used, the message sent by MBS AF includes a list of these SMF IDs, so that NEF can send a Nsmf_MBS Session Start Request messages to different SMFs separately. Alternatively, the MBS AF may add only one SMF ID to the message sent to NEF, so that the MBS AF sends a Nnef_MBS Session Start Request (including SMF ID, IP Multicast, TMGI, QoS, time to multicast, TMGI, QoS, time to multicast data transfer, estimated session duration, session ID) message to an NEF by using different SMF IDs respectively, and then the NEF sends a Nsmf_MBS Session Start Request message to the corresponding SMF.

S1710: Activate an MBS session, that is, establish a user plane from the UPF to the UE, especially allocate air interface resources of the UE and an RAN.

S1711: The MBS multicast service starts to send data to the IP multicast address, where the data first reaches the UPF, then reaches the RAN, and finally reaches the UE. Note: Because the user plane of the MBS multicast service is a propagation tree as a whole, the MBS AF first sends an IP multicast data packet to one or more UPFs, then the UPF sends this IP multicast data packet to one or more RANs, and the RAN then transmits this IP multicast data packet simultaneously to one or more UEs over an air interface.

Figure 18:
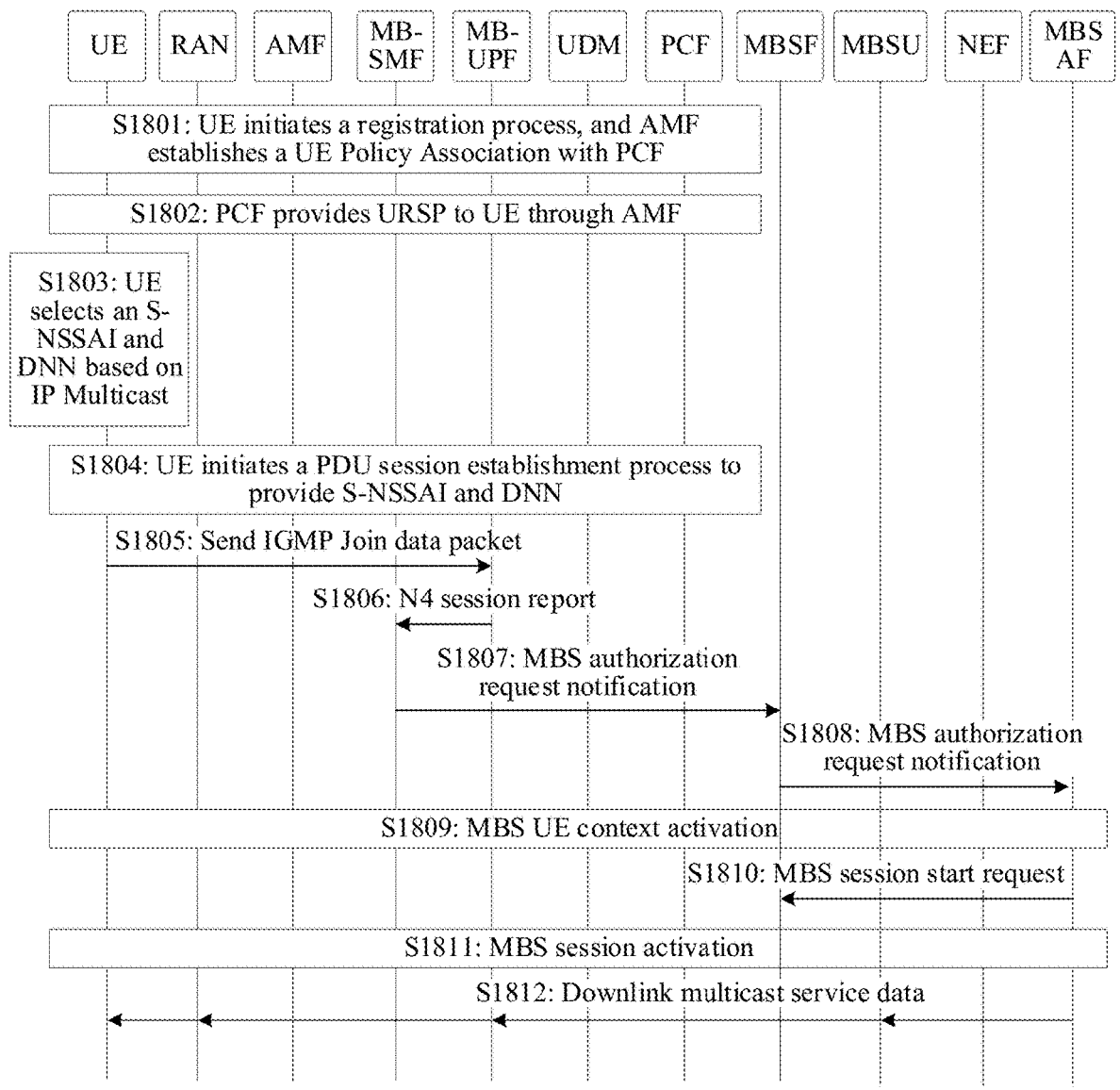
FIG. 18 is a flowchart of a URSP-based multicast communication method according to an embodiment of this application.

FIG. 18 shows a URSP-based multicast communication method according to an embodiment of this application. The multicast communication method is applicable to the system architecture shown in FIG. 13, and mainly includes the following steps:

S1801: A UE initiates a registration process, which is defined in clause 4.2.2.2 "Registration procedures" in the standard TS 23.502, and similar to S1021b shown in FIG. 10, an AMF establishes a UE Policy Association with a PCF.

S1802: According to clause 4.16.11 in the standard TS 23.502, in the process of establishing the UE Policy Association, the PCF pushes a URSP rule to the UE. The URSP rule includes the URSP rules containing MBS Multicast information in the above-mentioned Embodiment 1a, Embodiment 1b, Embodiment 1c, Embodiment 2a, Embodiment 2b, and Embodiment 2c.

S1803: When the UE needs to establish a multicast service context corresponding to an IP Multicast address, the UE queries a relevant URSP rule according to the IP Multicast address to obtain S-NSSAI and DNN information contained in the Route Selection Descriptor. Note: The IP Multicast address may be an IPv4 multicast address or an IPv6 multicast address.

S1804: According to the S-NSSAI and DNN obtained in S1803, the UE initiates a PDU session establishment process, that is, sends a PDU Session Establishment Request, where the request includes the S-NSSAI and DNN information obtained in S1803, etc.; then a M-AMF (not shown in FIG. 18) selects an MB-SMF according to the S-NSSAI and DNN information, the MB-SMF selects an MB-UPF, and then the MB-SMF assigns an IP address to the UE. This process is defined in clause 4.3.2 "PDU Session Establishment" of the standard TS 23.502. According to the 5G MBS standard, the M-AMF accessed by the UE at this time may be different from the AMF in S1801.

S1805: After a PDU session is established, the UE sends an IGMP Join data packet to the MB-UPF on the user plane by using the IP address assigned in S1804 as a source address, where the IGMP data packet is an IGMP Membership Report message. An IP Multicast address contained in the IGMP Join data packet is the IP Multicast address when S-NSSAI and DNN are selected in S1803. Note: If the IGMPv1/v2 protocol is used, the destination IP address of this IP packet is the IP multicast address; if the IGMPv3 protocol is used, the IP multicast address is in the IGMP protocol part of the IP packet.

S1806: The MB-UPF reports the multicast address information of the IGMP packet to the MB-SMF through an N4 Session Report message after detecting the IGMP Join data packet according to a Packet Detection Rule (PDR) configuration of the MB-SMF.

S1807: The MB-SMF determines an MBSF according to the information (S-NSSAI, DNN, UE ID, IP Multicast Address, etc.) involved in the establishment of the PDU Session in S1804, and then sends an MBS authorization request notification (Nmb-smf_MBS Authorization Request Notify) message to the MBSF, where the MBS authorization request notification message includes S-NSSAI, DNN, UE ID, IP Multicast Address, UE Location, etc. The UE ID may be a GPSI or a SUPI. The UE Location may be a CGI, a TAI, a GUAMI of the M-AMF, etc.

S1808: The MBSF determines an MBS AF according to the parameters (S-NSSAI, DNN, UE ID, IP Multicast Address, etc.) received in S1807, and then sends an Nmbsf_MBS Authorization Request Notify message (including S-NSSAI, DNN, UE ID, IP Multicast Address, UE Location) to the MBS AF.

In an embodiment of this application, the MBSF may not select an MBS AF in advance, but send the Nmbsf_MBS Authorization Request Notify message to an NEF; then the NEF determines an MBS AF according to the parameters (S-NSSAI, DNN, UE ID, IP Multicast Address) in the message and so on to, and sends a Nnef_MBS Authorization Request Notify message (where the message includes S-NSSAI, DNN, UE ID, IP Multicast Address, and UE Location) to the MBS AF.

S1809: Establish an MBS UE context of the entire UE in a 5G system.

S1810: Before sending multicast data to the same IP multicast address in S1803, the MBS AF sends an MBS session start request (Nmbsf_MBS Session Start Request) message to the MBSF, where the MBS session start request includes IP Multicast, TMGI, QoS, time to multicast data transfer, estimated session duration, session ID, etc.

In an embodiment of this application, when an NEF is used, the MBS AF first sends a Nnef_MBS Session Start Request (including a list of SMF IDs, IP Multicast, TMGI, QoS, time to multicast data transfer, estimated session duration, session ID) message, and then the NEF sends a Nmbsf_MBS Session Start Request (including IP Multicast, TMGI, QoS, time to multicast data transfer, estimated session duration, session ID) message to each MBSF.

Note: Because there are many UEs accessing the MBS Multicast service identified by the same IP Multicast Address, it is possible that different MBSFs are selected by different UEs. In this case, the MBS AF needs to send a message to all these MBSFs separately. In this case, if an NEF is used, the message sent by MBS AF includes a list of these MBSF IDs, so that NEF can send a Nmbsf_MBS Session Start Request to different MBSFs separately. Alternatively, the MBS AF may add only one MBSF ID to the message sent to NEF, so that the MBS AF sends a Nnef_MBS Session Start Request (including MBSF ID, IP Multicast, TMGI, QoS, time to multicast, TMGI, QoS, time to multicast data transfer, estimated session duration, session ID) message to an NEF by using different MBSF IDs respectively, and then the NEF sends a Nmbsf_MBS Session Start Request message to the corresponding MBSF.

S1811: Activate an MBS session, that is, establish a user plane from the UPF to the UE, especially allocate air interface resources of the UE and an RAN.

S1812: The MBS multicast service starts to send data to the IP multicast address, where the data first reaches an MBSU, then reaches the MB-UPF, then reaches the RAN, and finally reaches the UE. Note: Because the user plane of the MBS multicast service is a propagation tree as a whole, the MBS AF first sends IP multicast data packets to one or more MBSUFs, then the MBSU sends this IP multicast data packet to one or more MB-UPFs, then the MB-UPF sends this IP multicast data packet to one or more RANs, and the RAN then transmits this IP multicast data packet simultaneously to one or more UEs over an air interface.

Figure 19:
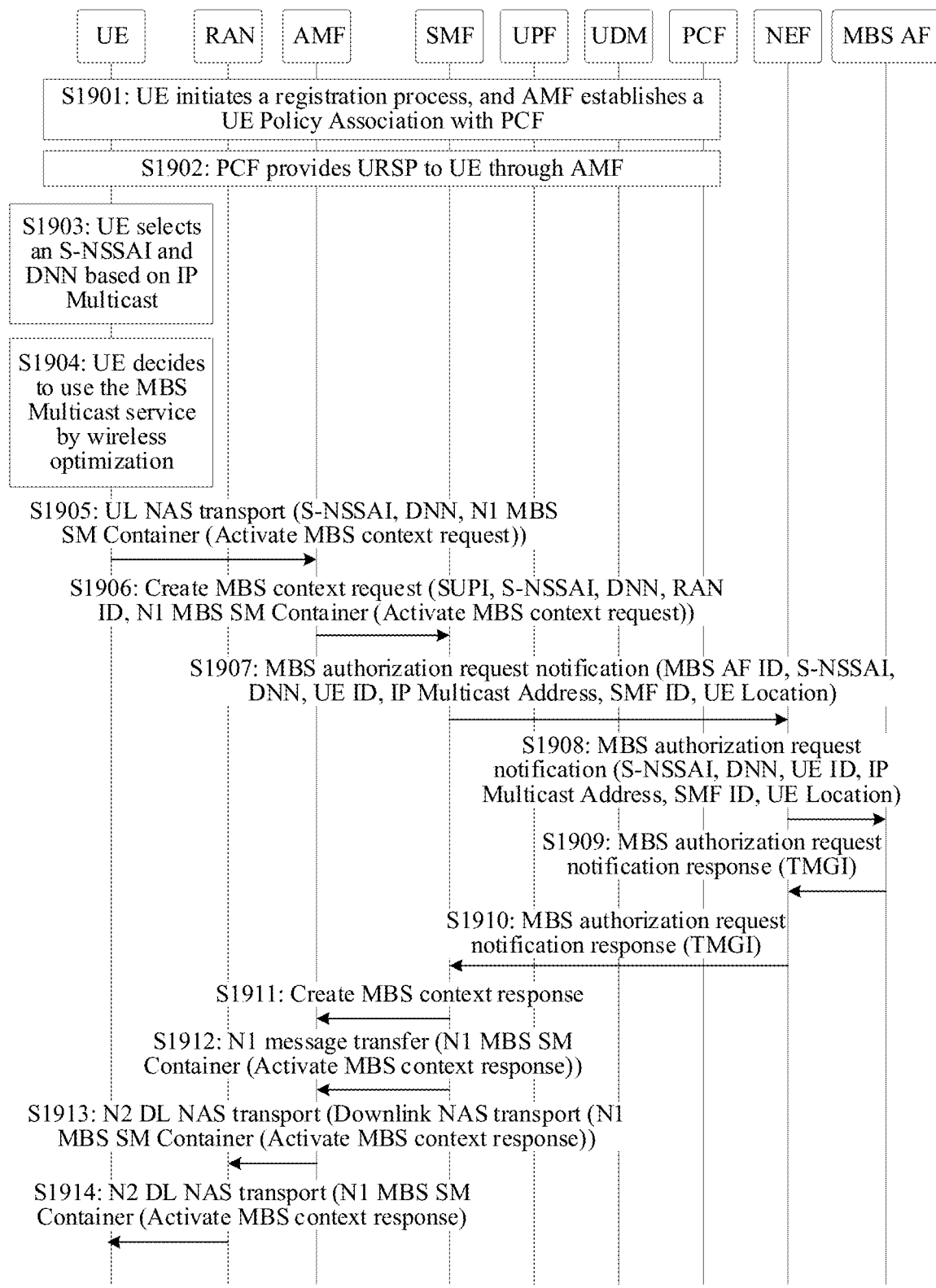
FIG. 19 is a flowchart of a URSP-based multicast communication method according to an embodiment of this application.

FIG. 19 shows a URSP-based multicast communication method according to an embodiment of this application. The multicast communication method is applicable to the system architecture shown in FIG. 12, and mainly includes the following steps:

S1901: A UE initiates a registration process, which is defined in clause 4.2.2.2 "Registration procedures" in the standard TS 23.502, and similar to S1021b shown in FIG. 10, an AMF establishes a UE Policy Association with a PCF.

S1902: According to clause 4.16.11 in the standard TS 23.502, in the process of establishing the UE Policy Association, the PCF pushes a URSP rule to the UE. The URSP rule includes the URSP rules containing MBS Multicast information in the above-mentioned Embodiment 1a, Embodiment 1b, Embodiment 1c, Embodiment 2a, Embodiment 2b, and Embodiment 2c.

S1903: When the UE needs to establish a multicast service context corresponding to an IP Multicast address, the UE queries a relevant URSP rule according to the IP Multicast address to obtain S-NSSAI and DNN information contained in the Route Selection Descriptor. Note: The IP Multicast address may be an IPv4 multicast address or an IPv6 multicast address.

S1904: The UE decides to use the MBS Multicast service by wireless optimization, that is, it is not necessary to establish a PDU session and assign an IP address in advance. How the UE decides to use the wireless optimization is not limited. For example, for a "screen" placed in a public place (e.g., a cafeteria or a departure lobby), such an optimization can be used to display some multicast services.

S1905: The UE initiates an MBS context activation process to an IP Multicast Address, and the UE assigns an MBS Context ID to an MBS Session, and sends an Activate MBS Context Request (including the MBS Context ID and the IP Multicast Address) request to an SMF. Similar to the PDU Session establishment Request, the Activate MBS Context Request message is sent to an AMF as an information element in an UL NAS Transport message. The UL NAS Transport message contains the S-NSSAI and DNN obtained in step S1903, and also contains an N1 MBS Session Management (SM) Container, where the N1 MBS SM Container contains the MBS Context ID and the IP Multicast Address.

S1906: The AMF selects an SMF according to the S-NSSAI and the DNN, and then sends a create MBS context request (i.e., Nsmf_MBS Session Create MBS Context Request) to the SMF, where the create MBS context request includes SUPI, S-NSSAI, DNN, RAN ID, and N1 MBS SM Container (Activate MBS Context Request (IP multicast address)). The SMF records the RAN ID in the MBS UE Context of the UE.

S1907: The SMF determines whether the UE can use the MBS service of the IP Multicast Address according to subscription data of the UE obtained from a UDM (where the interaction between the SMF and the UDM is not shown in the figure). If permitted, an MBS AF is determined according to the information (S-NSSAI, DNN, IP Multicast Address), and then an MBS authorization request notification message (i.e., Nsmf_MBS Authorization Request Notify) message is sent to the MBS AF, where the MBS authorization request notification message includes MBS AF ID, S-NSSAI, DNN, UE ID, IP Multicast Address, SMF ID, UE Location, etc. The SMF ID represents an identifier of the SMF that sends this message. The UE ID may be a GPSI or a SUPI. The UE Location may be a CGI, a TAI, a GUAMI, etc.

If the network configuration requires that the message sent to the MBS AF must be sent to an NEF first, then the message is sent to an NEF first, where the message includes the MBS AF ID parameter (FIG. 19 shows an embodiment where the message is sent to an NEF first and then sent by the NEF to the MBS AF).

S1908: After receiving the message, the NEF sends an Nnef_MBS Authorization Request Notify message (including S-NSSAI, DNN, UE ID, IP Multicast Address, SMF ID, and UE Location) to the MBS AF according to the MBS AF ID parameter.

S1909: The MBS AF records the SMF ID corresponding to the IP Multicast Address in the message. If the message is received by the MBS AF from the SMF, the MBS AF replies to the SMF with an Nsmf_MBS Authorization Request Notify Response (including TMSI). If the message is received by the MBS AF from the NEF, the MBS AF replies with an Nnef_MBS Authorization Request Notify Response (including TMGI). If the MBS AF authorization is unsuccessful, no TMGI is allocated in the response message, and a cause of the failure is given. TMSI represents Temporary Mobile Subscriber Identity. TMGI represents Temporary Mobile Group Identify.

S1910: The NEF replies to the SMF with an MBS authorization request notification response (i.e., Nsmf_MBS Authorization Request Notify Response), where the MBS authorization request notification response includes the TMSI.

S1911: The SMF creates an MBS UE Context based on the IP Multicast Address for the UE, and then replies to the AMF with a create MBS context response (i.e., Nsmf_MBS Session_Create MBS Context Response).

S1912: The SMF decides to reply to the request of the UE, and sends a message Namf_Communication_ N1MessageTransfer (N1 MBS SM Container (Activate MBS Context Response (TMGI))) to the AMF, where the N1 MBS SM Container (Activate MBS Context Response (TMGI)) is an MBS session management response to be sent to the UE. Because no air interface resource is established, this message does not contain N2 MBS Session Container provided by the SMF to the RAN.

S1913: The AMF sends an N2 downlink NAS Transport (DL NAS Transport (N1 MBS SM Container (Activate MBS Context Response (TMGI)))) to the RAN, to instruct the RAN to directly send the DL NAS Transport (N1 MBS SM Container (Activate MBS Context Response (TMGI))) to the UE.

S1914: The UE receives the NAS message, and determines according to the Activate MBS Context Response (TMGI) in the MBS SM Container that the MBS context corresponding to the IP Multicast Group is successfully activated, and assigns a TMGI, so that subsequently the multicast service can be performed.

The technical solutions of the embodiments of this application enable a UE to activate an MBS Multicast UE context by sending one request, and support IPv4 and IPv6 multicast addresses as well as IGMPv1/2/3 protocols. In addition, the technical solutions of the embodiments of this application support the existing two 5G MBS architectures, and can improve the efficiency of multicast communication.

Apparatus embodiments of this application will be described below. The apparatus described below may be configured to implement the multicast communication method in the above embodiments of this application. For details that are not disclosed in the apparatus embodiments of this application, reference may be made to the above method embodiments of this application.

Figure 20:
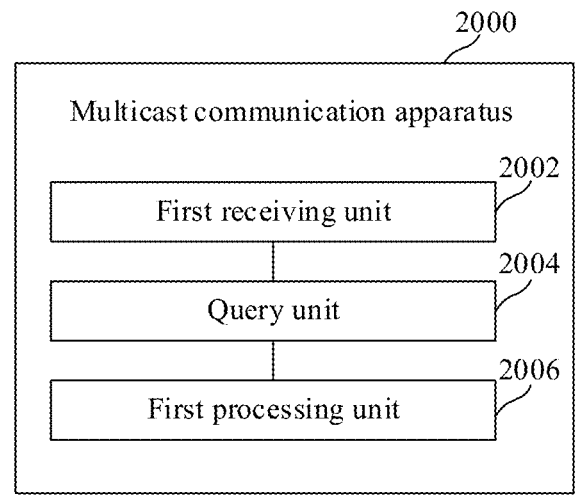
FIG. 20 is a block diagram of a multicast communication apparatus according to an embodiment of this application.

FIG. 20 is a block diagram of a multicast communication apparatus according to an embodiment of this application. The multicast communication apparatus may be disposed in a terminal device.

Referring to FIG. 20, a multicast communication apparatus 2000 according to an embodiment of this application includes a first receiving unit 2002, a query unit 2004, and a first processing unit 2006.

The first receiving unit 2002 is configured to receive UE route selection policy (URSP) information transmitted by a policy control function entity, the URSP information including a URSP rule supporting a multicast service. The query unit 2004 is configured to query the URSP rule supporting the multicast service according to a multicast network address corresponding to a multicast service context that needs to be activated, to obtain network slice information and data network name information. The first processing unit 2006 is configured to activate Multicast and Broadcast Service (MBS) context information of a user equipment based on the network slice information and the data network name information, to join a multicast group corresponding to the multicast network address for multicast communication.

In some embodiments of this application, based on the foregoing solution, the first processing unit 2006 is configured to: initiate a protocol data unit (PDU) session establishment request based on the network slice information and the data network name information to establish a PDU session; and activate the MBS context information of the user equipment based on the established PDU session.

In some embodiments of this application, based on the foregoing solution, the first processing unit 2006 is configured to: transmit an Internet Group Management Protocol (IGMP) data packet including the multicast network address to a user plane function entity by using a network address assigned during establishment of the PDU session as a source address, where the IGMP data packet is used for instructing to activate the MBS context information of the user equipment.

In some embodiments of this application, based on the foregoing solution, the first processing unit 2006 is configured to: transmit the IGMP data packet to the user plane function entity in a mobile communication system framework when the mobile communication system framework is used to perform a multicast and broadcast service; and transmit the IGMP data packet to the user plane function entity configured to perform a multicast and broadcast service in a new multicast and broadcast service system architecture when the new multicast and broadcast service system architecture is used.

In some embodiments of this application, based on the foregoing solution, the first processing unit 2006 is further configured to: when it is determined based on the network slice information and the data network name information that a matching PDU session already exists, activate the MBS context information of the user equipment directly based on the matching PDU session.

In some embodiments of this application, based on the foregoing solution, the URSP rule supporting the multicast service includes a first IP address descriptor for an MBS or multicast service, where the first IP address descriptor is used for describing a destination IP address 2-tuple, and the destination IP address 2-tuple includes the multicast network address and an IGMP protocol above an IP protocol.

In some embodiments of this application, based on the foregoing solution, the URSP rule in the URSP information includes a second IP address descriptor for describing a destination IP address 3-tuple, and the destination IP address 3-tuple includes an IP address or IPv6 network prefix, and includes a port number and a protocol identifier of a protocol above an IP protocol, wherein, when a destination IP address 3-tuple described by a second IP address descriptor in a URSP rule includes the multicast network address and an IGMP protocol and does not include a port number, the URSP rule is determined as the URSP rule supporting the multicast service.

In some embodiments of this application, based on the foregoing solution, the URSP rule in the URSP information includes connection capabilities information, and a value of the connection capabilities information includes a code value used for indicating multicast communication, wherein, when a value of connection capabilities information in a URSP rule is a code value indicating multicast communication and a destination IP address 3-tuple described by an IP address descriptor in the URSP rule includes the multicast network address and an IGMP protocol and does not include a port number, the URSP rule is determined as the URSP rule supporting the multicast service.

In some embodiments of this application, based on the foregoing solution, the URSP rule supporting the multicast service includes connection capabilities information, and a first IP address descriptor for an MBS or multicast service;

the first IP address descriptor is used for describing a destination IP address 2-tuple, and the destination IP address 2-tuple includes the multicast network address and an IGMP protocol above an IP protocol; and a value of the connection capabilities information indicates a code value of multicast communication.

In some embodiments of this application, based on the foregoing solution, the URSP rule in the URSP information includes connection capabilities information, and a value of the connection capabilities information includes a code value used for indicating multicast communication or broadcast communication, wherein, when a value of a connection capabilities information in a URSP rule is a code value indicating multicast communication, the URSP rule is determined as a URSP rule supporting the multicast service through downlink transmission.

In some embodiments of this application, based on the foregoing solution, the URSP rule in the URSP information includes a third IP address descriptor for an MBS or multicast service or broadcast service, the third IP address descriptor is used for describing a downlink destination IP address 3-tuple, and the downlink destination IP address 3-tuple includes a multicast network address or a broadcast network address and includes a port number and a protocol identifier of a protocol above an IP protocol, wherein, when a downlink destination IP address 3-tuple described by a third IP address descriptor in a URSP rule includes a multicast network address, the URSP rule is determined as the URSP rule supporting the multicast service through downlink transmission.

In some embodiments of this application, based on the foregoing solution, the URSP rule in the URSP information includes connection capabilities information, and a value of the connection capabilities information includes a code value used for indicating multicast communication or broadcast communication, when a value of connection capabilities information in a URSP rule is a code value indicating multicast communication and a third IP address descriptor for an MBS or multicast service or broadcast service in the URSP rule includes a multicast network address, a port number, and a protocol identifier of a protocol above an IP protocol, the URSP rule is determined as the URSP rule supporting the multicast service through downlink transmission.

In some embodiments of this application, based on the foregoing solution, the first receiving unit 2002 is configured to: after transmitting a registration request, receive a user equipment policy information transmitted by the policy control function entity, the user equipment policy information including the URSP information.

Figure 21:
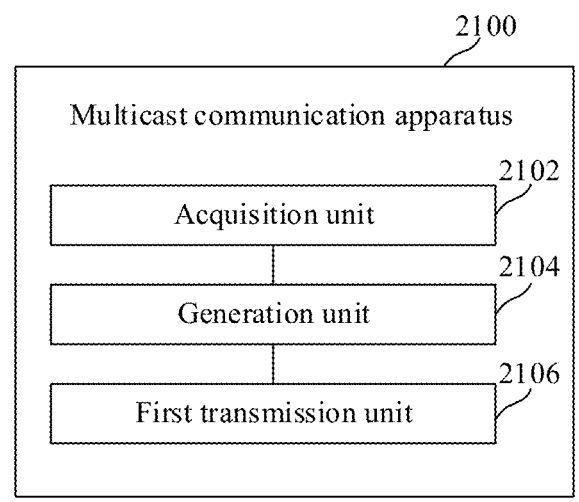
FIG. 21 is a block diagram of a multicast communication apparatus according to an embodiment of this application.

FIG. 21 is a block diagram of a multicast communication apparatus according to an embodiment of this application. The multicast communication apparatus may be disposed in a session management function entity.

Referring to FIG. 21, a multicast communication apparatus 2100 according to an embodiment of this application includes an acquisition unit 2102, a generation unit 2104, and a first transmission unit 2106.

The acquisition unit 2102 is configured to acquire identification information of a user equipment, a multicast network address corresponding to a multicast service context that the user equipment needs to activate, and network slice information and data network name information selected by the user equipment according to a UE route selection policy (URSP) rule supporting a multicast service. The generation unit 2104 is configured to generate a multicast service authorization request notification message according to the network slice information, the data network name information, the identification information of the user equipment, and the multicast network address. The first transmission unit 2106 is configured to transmit the multicast service authorization request notification message to an application function entity corresponding to an MBS, to activate MBS context information of the user equipment.

In some embodiments of this application, based on the foregoing solution, the acquisition unit 2102 is configured to: receive a session report message transmitted by a user plane function entity, and acquire the multicast network address according to the session report message; and acquire the network slice information, the data network name information, and the identification information of the user equipment according to information used during establishment of a protocol data unit (PDU) session of the user equipment.

In some embodiments of this application, based on the foregoing solution, when a mobile communication system framework is used to perform a multicast and broadcast service, the first transmission unit 2106 is configured to: determine the application function entity corresponding to the MBS according to the network slice information, the data network name information, the identification information of the user equipment, and the multicast network address; and transmit the multicast service authorization request notification message directly to the application function entity, or transmit the multicast service authorization request notification message to a network exposure function entity, so that the network exposure function entity forwards the multicast service authorization request notification message to the application function entity.

In some embodiments of this application, based on the foregoing solution, when a mobile communication system framework is used to perform a multicast and broadcast service, the first transmission unit 2106 is configured to: transmit the multicast service authorization request notification message to a network exposure function entity, so that the network exposure function entity determines the application function entity corresponding to the MBS according to information included in the multicast service authorization request notification message, and transmits the multicast service authorization request notification message to the application function entity.

In some embodiments of this application, based on the foregoing solution, when a mobile communication system framework is used to perform a multicast and broadcast service, the multicast communication apparatus 2100 further includes: a first activation unit, configured to: after the first transmission unit 2106 transmits the multicast service authorization request notification message to the application function entity corresponding to the MBS, receive a multicast service session start request from the application function entity, and activate the multicast service session based on the multicast service session start request.

In some embodiments of this application, based on the foregoing solution, the first activation unit is configured to: receive the multicast service session start request directly transmitted by the application function entity; or receive a multicast service session start request from the application function entity that is forwarded by a network exposure function entity, wherein the multicast service session start request transmitted by the application function entity to the network exposure function entity includes a list of identifiers of session management function entities to which the multicast service session start request is to be transmitted, or the application function entity transmits a plurality of multicast service session start requests to the network exposure function entity, each multicast service session start request including an identifier of one session management function entity to which the multicast service session start request is to be transmitted.

In some embodiments of this application, based on the foregoing solution, when a new multicast and broadcast service system architecture is used, the first transmission unit 2106 is configured to: determine a corresponding multicast and broadcast service function (MBSF) according to the network slice information, the data network name information, the identification information of the user equipment, and the multicast network address; and transmit the multicast service authorization request notification message to the MBSF, so that the MBSF forwards the multicast service authorization request notification message to the application function entity.

Figure 22:
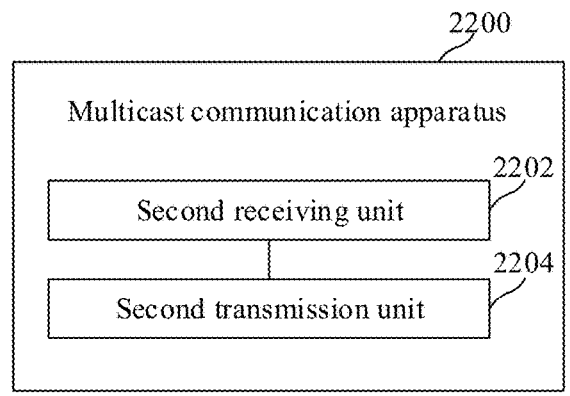
FIG. 22 is a block diagram of a multicast communication apparatus according to an embodiment of this application.

FIG. 22 is a block diagram of a multicast communication apparatus according to an embodiment of this application. The multicast communication apparatus may be disposed in an MBSF.

Referring to FIG. 22, a multicast communication apparatus 2200 according to an embodiment of this application includes a second receiving unit 2202 and a second transmission unit 2204.

The second receiving unit 2202 is configured to receive a multicast service authorization request notification message transmitted by a session management function entity corresponding to a multicast service, the multicast service authorization request notification message including identification information of a user equipment, a multicast network address corresponding to a multicast service context that the user equipment needs to activate, and network slice information and data network name information selected by the user equipment according to a UE route selection policy (URSP) rule supporting a multicast service. The second transmission unit 2204 is configured to transmit the multicast service authorization request notification message to an application function entity corresponding to a Multicast and Broadcast Service (MBS), to activate MBS context information of the user equipment.

In some embodiments of this application, based on the foregoing solution, the second transmission unit 2204 is configured to: determine the application function entity corresponding to the MBS according to information included in the multicast service authorization request notification message; and transmit the multicast service authorization request notification message directly to the application function entity, or transmit the multicast service authorization request notification message to a network exposure function entity, so that the network exposure function entity forwards the multicast service authorization request notification message to the application function entity.

In some embodiments of this application, based on the foregoing solution, the second transmission unit 2204 is configured to: transmit the multicast service authorization request notification message to a network exposure function entity, so that the network exposure function entity determines the application function entity corresponding to the MBS according to information included in the multicast service authorization request notification message, and transmits the multicast service authorization request notification message to the application function entity.

In some embodiments of this application, based on the foregoing solution, the multicast communication apparatus 2200 further includes: a second activation unit, configured to: after the second transmission unit 2204 transmits the multicast service authorization request notification message to the application function entity corresponding to the MBS, receive a multicast service session start request from the application function entity, and activate the multicast service session based on the multicast service session start request.

In some embodiments of this application, based on the foregoing solution, the second receiving unit 2202 is configured to: receive the multicast service session start request directly transmitted by the application function entity; or receive a multicast service session start request from the application function entity that is forwarded by a network exposure function entity, wherein the multicast service session start request transmitted by the application function entity to the network exposure function entity includes a list of identifiers of multicast and broadcast service functions (MBSFs) to which the multicast service session start request is to be transmitted, or the application function entity transmits a plurality of multicast service session start requests to the network exposure function entity, each multicast service session start request including an identifier of one MBSF to which the multicast service session start request is to be transmitted.

Figure 23:
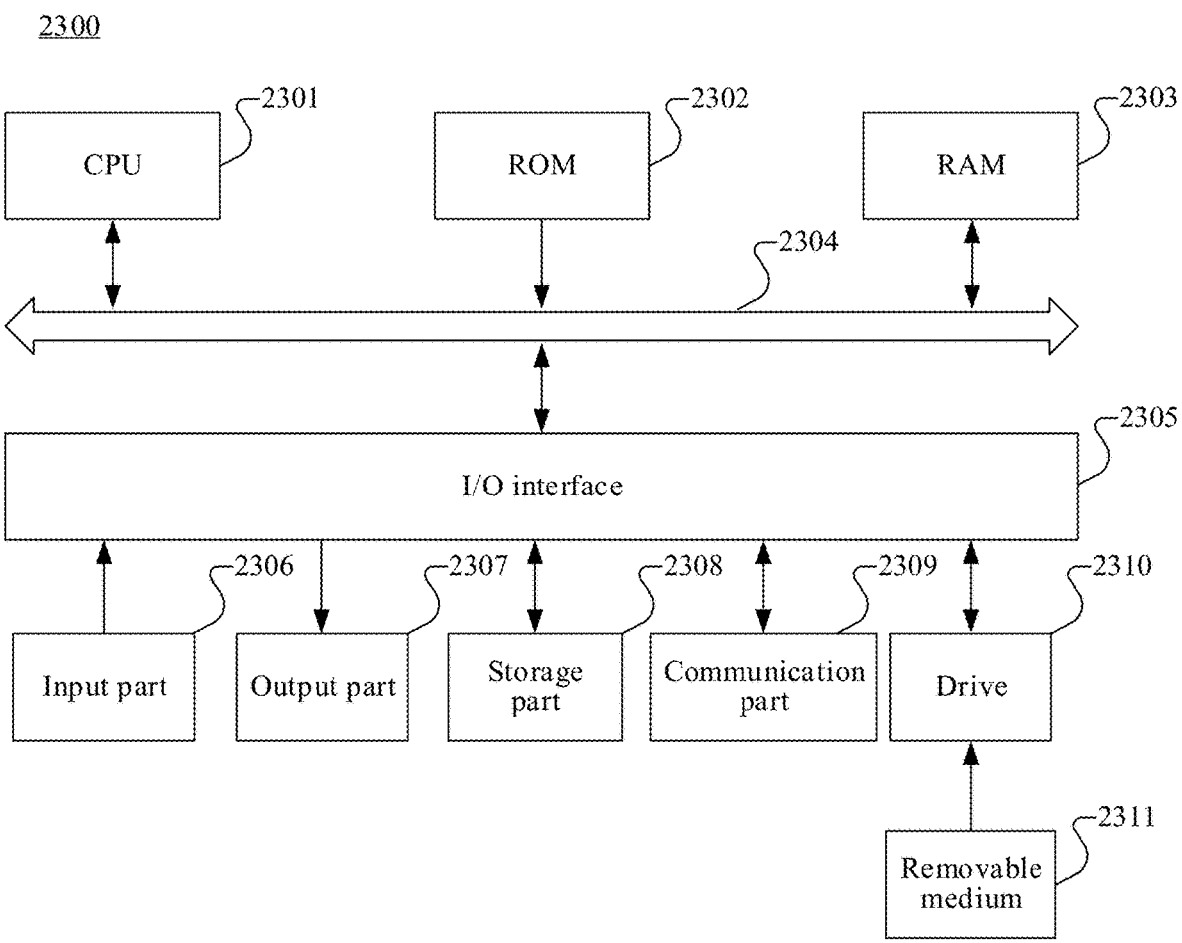
FIG. 23 is a schematic structural diagram of a computer system of an electronic device adapted to implement the embodiments of this application.

FIG. 23 is a schematic structural diagram of a computer system adapted to implement an electronic device according to an embodiment of this application.

The computer system 2300 of the electronic device shown in FIG. 23 is merely an example, and does not constitute any limitation on functions and use ranges of the embodiments of this application.

As shown in FIG. 23, the computer system 2300 includes a central processing unit (CPU) 2301, which can perform various appropriate actions and processes, for example, execute the methods described in the above embodiments according to a program stored in a Read-Only Memory (ROM) 2302 or a program loaded from a storage part 2308 to a Random Access Memory (RAM) 2303. The RAM 2303 further stores various programs and data required for system operations. The CPU 2301, the ROM 2302, and the RAM 2303 are connected to each other through a bus 2304. An input/output (I/O) interface 2305 is also connected to the bus 2304.

The following components are connected to the I/O interface 2305: an input part 2306 including a keyboard, mouse, etc.; an output part 2307 including a cathode ray tube (CRT), a liquid crystal display (LCD), a speaker, and the like; a storage part 2308 including hard disk, etc.; and a storage part 908 including a hard disk and the like; and a communication part 2309 including a network interface card such as a local area network (LAN) card, a modem, and the like. The communication part 2309 performs communication processing by using a network such as the Internet. A drive 2310 is also connected to the I/O interface 2305 as required. A removable medium 2311, such as a magnetic disk, an optical disc, a magneto-optical disk, or a semiconductor memory, is installed on the drive 2310 as required, so that a computer program read from the removable medium is installed into the storage part 2308 as required.

Particularly, according to an embodiment of this application, the processes described above by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed from a network through the communication part 2309, and/or installed from the removable medium 2311. When the computer program is executed by the CPU 2301, the various functions defined in the system of this application are executed.

The computer-readable medium shown in the embodiments of this application may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include, but is not limited to an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium containing or storing a program, and the program may be used by or used in combination with an instruction execution system, apparatus, or device. In this application, the computer-readable signal medium may include a data signal transmitted in a baseband or as part of a carrier, and stores a computer-readable computer program. The propagated data signal may be in a plurality of forms, including but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of this application may be implemented in a software manner, or may be implemented in a hardware manner, and the unit described can also be set in a processor. Names of the units do not constitute a limitation on the units in a specific case.

In another aspect, this application further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

An embodiment of this application further provides a computer program product including instructions, the instructions, when run on a computer, causing the computer to perform the method according to the foregoing embodiments.

Although several modules or units of a device for action execution are mentioned in the foregoing detailed descriptions, the division is not mandatory. Actually, according to the implementations of this application, the features and functions of two or more modules or units described above may be specified in one module or unit. Conversely, features and functions of one module or unit described above may be further divided into a plurality of modules or units to be specified.

Through the descriptions of the foregoing implementations, a person skilled in the art easily understands that the exemplary implementations described herein may be implemented through software, or may be implemented through software located in combination with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of this application.

After considering the specification and practicing the disclosed embodiments, a person skilled in the art may easily conceive of other implementations of this application. This application is intended to cover any variations, uses, or adaptive changes of this application following the general principles of this application, and includes well-known knowledge and conventional technical means in the art and undisclosed in this application.

It is to be understood that this application is not limited to the precise structures described above and shown in the accompanying drawings, and various modifications and changes may be made without departing from the scope of this application. The scope of this application is subject only to the appended claims.

What is claimed is:

1. A multicast communication method implemented by a user equipment (UE), including:
   receiving UE route selection policy (URSP) information transmitted by a policy control function entity, the URSP information including a URSP rule supporting a multicast service; and
   querying, in the URSP rule supporting the multicast service received by the UE and according to a multicast network address corresponding to a multicast service context that needs to be activated, network slice information and data network name information;

wherein Multicast and Broadcast Service (MBS) context information of the user equipment is activated through an MBS Application Function (AF) based on the network slice information and the data network name information, and the user equipment is added to a multicast group corresponding to the multicast network address for multicast communication, wherein the URSP rule in the URSP information includes connection capabilities information and an IP descriptor, and one of the following is true:

the IP descriptor includes a first IP address descriptor for an MBS or multicast service describing a destination IP address 2-tuple, and the destination IP address 2-tuple includes the multicast network address and an IGMP protocol above an IP protocol;

the IP descriptor includes a second IP address descriptor for describing a destination IP address 3-tuple, and the destination IP address 3-tuple includes: an IP address or IPV6 network prefix, a port number, and a protocol identifier of a protocol above an IP protocol, wherein, when a destination IP address 3-tuple described by a second IP address descriptor in a first URSP rule includes the multicast network address and an IGMP protocol and does not include a port number, the first URSP rule is determined as the URSP rule supporting the multicast service;

a value of the connection capabilities information includes a code value indicating multicast communication, wherein, when a value of connection capabilities information in a second URSP rule is a code value indicating multicast communication and a destination IP address 3-tuple described by an IP address descriptor in the second URSP rule includes the multicast network address and an IGMP protocol and does not include a port number, the second URSP rule is determined as the URSP rule supporting the multicast service;

the IP descriptor includes the first IP address descriptor, and the value of the connection capabilities information is the code value indicating multicast communication;

the value of the connection capabilities information includes a code value indicating multicast communication or broadcast communication, wherein, when a value of a connection capabilities information in a third URSP rule is the code value indicating multicast communication, the third URSP rule is determined as a URSP rule supporting the multicast service through a downlink transmission;

the IP descriptor includes a third IP address descriptor for an MBS or multicast service or broadcast service, the third IP address descriptor describes a downlink destination IP address 3-tuple, and the downlink destination IP address 3-tuple includes: a multicast network address or a broadcast network address, a port number, and a protocol identifier of a protocol above an IP protocol, wherein, when a downlink destination IP address 3-tuple described by a third IP address descriptor in a fourth URSP rule includes a multicast network address, the fourth URSP rule is determined as the URSP rule supporting the multicast service through a downlink transmission; or the value of the connection capabilities information includes a code value indicating multicast communication or broadcast communication, wherein, when a value of connection capabilities information in a fifth URSP rule is a code value indicating multicast communication and a third IP address descriptor for an MBS or multicast service or broadcast service in the fifth URSP rule includes a multicast network address, a port number, and a protocol identifier of a protocol above an IP protocol, the fifth URSP rule is determined as the URSP rule supporting the multicast service through downlink transmission.

2. The multicast communication method according to claim 1, wherein the activating MBS context information of a user equipment based on the network slice information and the data network name information includes:

initiating a protocol data unit (PDU) session establishment request based on the network slice information and the data network name information to establish a PDU session; and activating the MBS context information of the user equipment based on the established PDU session.

3. The multicast communication method according to claim 2, wherein the activating the MBS context information of the user equipment based on the established PDU session includes:

transmitting an Internet Group Management Protocol (IGMP) data packet including the multicast network address to a user plane function entity by using a network address assigned during establishment of the PDU session as a source address, the IGMP data packet being used for instructing to activate the MBS context information of the user equipment.

4. The multicast communication method according to claim 3, wherein the transmitting an Internet Group Management Protocol (IGMP) data packet including the multicast network address to a user plane function entity includes:

transmitting the IGMP data packet to the user plane function entity in a mobile communication system framework when the mobile communication system framework is used to perform a multicast and broadcast service; and transmitting the IGMP data packet to the user plane function entity configured to perform a multicast and broadcast service in a new multicast and broadcast service system architecture when the new multicast and broadcast service system architecture is used.

5. The multicast communication method according to claim 2, wherein the method further comprises:

when a matching PDU session exists according to the network slice information and the data network name information, activating the MBS context information of the user equipment based on the matching PDU session.

6. The multicast communication method according to claim 1, wherein the receiving UE route selection policy (URSP) information transmitted by a policy control function entity includes:

after transmitting a registration request, receiving a user equipment policy information transmitted by the policy control function entity, the user equipment policy information including the URSP information.

7. A non-transitory computer-readable storage medium, storing a computer program, the computer program, when executed by a processor of a user equipment (UE), cause the processor to perform:

receiving UE route selection policy (URSP) information transmitted by a policy control function entity, the URSP information including a URSP rule supporting a multicast service; and querying, in the URSP rule supporting the multicast service received by the UE and according to a multicast network address corresponding to a multicast service context that needs to be activated, network slice information and data network name information;
wherein Multicast and Broadcast Service (MBS) context information of the user equipment is activated through an MBS Application Function (AF) based on the network slice information and the data network name information, and the user equipment is added to a multicast group corresponding to the multicast network address for multicast communication,
wherein the URSP rule in the URSP information includes connection capabilities information and an IP descriptor, and one of the following is true:
the IP descriptor includes a first IP address descriptor for an MBS or multicast service describing a destination IP address 2-tuple, and the destination IP address 2-tuple includes the multicast network address and an IGMP protocol above an IP protocol;
the IP descriptor includes a second IP address descriptor for describing a destination IP address 3-tuple, and the destination IP address 3-tuple includes: an IP address or IPv6 network prefix, a port number, and a protocol identifier of a protocol above an IP protocol, wherein, when a destination IP address 3-tuple described by a second IP address descriptor in a first URSP rule includes the multicast network address and an IGMP protocol and does not include a port number, the first URSP rule is determined as the URSP rule supporting the multicast service;
a value of the connection capabilities information includes a code value indicating multicast communication, wherein, when a value of connection capabilities information in a second URSP rule is a code value indicating multicast communication and a destination IP address 3-tuple described by an IP address descriptor in the second URSP rule includes the multicast network address and an IGMP protocol and does not include a port number, the second URSP rule is determined as the URSP rule supporting the multicast service;
the IP descriptor includes the first IP address descriptor, and the value of the connection capabilities information is the code value indicating multicast communication;
the value of the connection capabilities information includes a code value indicating multicast communication or broadcast communication, wherein, when a value of a connection capabilities information in a third URSP rule is the code value indicating multicast communication, the third URSP rule is determined as a URSP rule supporting the multicast service through a downlink transmission;
the IP descriptor includes a third IP address descriptor for an MBS or multicast service or broadcast service, the third IP address descriptor describes a downlink destination IP address 3-tuple, and the downlink destination IP address 3-tuple includes: a multicast network address or a broadcast network address, a port number, and a protocol identifier of a protocol above an IP protocol, wherein, when a downlink destination IP address 3-tuple described by a third IP address descriptor in a fourth URSP rule includes a multicast network address, the fourth URSP rule is determined as the URSP rule supporting the multicast service through a downlink transmission; or
the value of the connection capabilities information includes a code value indicating multicast communication or broadcast communication, wherein, when a value of connection capabilities information in a fifth URSP rule is a code value indicating multicast communication and a third IP address descriptor for an MBS or multicast service or broadcast service in the fifth URSP rule includes a multicast network address, a port number, and a protocol identifier of a protocol above an IP protocol, the fifth URSP rule is determined as the URSP rule supporting the multicast service through downlink transmission.

8. The storage medium according to claim 7, wherein the activating MBS context information of a user equipment based on the network slice information and the data network name information includes:
initiating a protocol data unit (PDU) session establishment request based on the network slice information and the data network name information to establish a PDU session; and
activating the MBS context information of the user equipment based on the established PDU session.

9. The storage medium according to claim 8, wherein the activating the MBS context information of the user equipment based on the established PDU session includes:
transmitting an Internet Group Management Protocol (IGMP) data packet including the multicast network address to a user plane function entity by using a network address assigned during establishment of the PDU session as a source address, the IGMP data packet being used for instructing to activate the MBS context information of the user equipment.

10. The storage medium according to claim 9, wherein the transmitting an Internet Group Management Protocol (IGMP) data packet including the multicast network address to a user plane function entity includes:
transmitting the IGMP data packet to the user plane function entity in a mobile communication system framework when the mobile communication system framework is used to perform a multicast and broadcast service; and
transmitting the IGMP data packet to the user plane function entity configured to perform a multicast and broadcast service in a new multicast and broadcast service system architecture when the new multicast and broadcast service system architecture is used.

11. The storage medium according to claim 8, wherein the computer program further cause the processor to perform:
when a matching PDU session exists according to the network slice information and the data network name information, activating the MBS context information of the user equipment based on the matching PDU session.

12. An electronic device of a user equipment (UE), comprising:
one or more processors; and
a memory, configured to store one or more programs, the one or more programs, when executed by one or more processors, causing the one or more processors to implement:
receiving UE route selection policy (URSP) information transmitted by a policy control function entity, the URSP information including a URSP rule supporting a multicast service; and
querying, in the URSP rule supporting the multicast service received by the UE and according to a multicast network address corresponding to a multicast service context that needs to be activated, network slice information and data network name information;
wherein Multicast and Broadcast Service (MBS) context information of the user equipment is activated through an MBS Application Function (AF) based on the network slice information and the data network name information, and the user equipment is added to a multicast group corresponding to the multicast network address for multicast communication, wherein the URSP rule in the URSP information includes connection capabilities information and an IP descriptor, and one of the following is true:

the IP descriptor includes a first IP address descriptor for an MBS or multicast service describing a destination IP address 2-tuple, and the destination IP address 2-tuple includes the multicast network address and an IGMP protocol above an IP protocol;

the IP descriptor includes a second IP address descriptor for describing a destination IP address 3-tuple, and the destination IP address 3-tuple includes: an IP address or IPV6 network prefix, a port number, and a protocol identifier of a protocol above an IP protocol, wherein, when a destination IP address 3-tuple described by a second IP address descriptor in a first URSP rule includes the multicast network address and an IGMP protocol and does not include a port number, the first URSP rule is determined as the URSP rule supporting the multicast service;

a value of the connection capabilities information includes a code value indicating multicast communication, wherein, when a value of connection capabilities information in a second URSP rule is a code value indicating multicast communication and a destination IP address 3-tuple described by an IP address descriptor in the second URSP rule includes the multicast network address and an IGMP protocol and does not include a port number, the second URSP rule is determined as the URSP rule supporting the multicast service;

the IP descriptor includes the first IP address descriptor, and the value of the connection capabilities information is the code value indicating multicast communication;

the value of the connection capabilities information includes a code value indicating multicast communication or broadcast communication, wherein, when a value of a connection capabilities information in a third URSP rule is the code value indicating multicast communication, the third URSP rule is determined as a URSP rule supporting the multicast service through a downlink transmission;

the IP descriptor includes a third IP address descriptor for an MBS or multicast service or broadcast service, the third IP address descriptor describes a downlink destination IP address 3-tuple, and the downlink destination IP address 3-tuple includes: a multicast network address or a broadcast network address, a port number, and a protocol identifier of a protocol above an IP protocol, wherein, when a downlink destination IP address 3-tuple described by a third IP address descriptor in a fourth URSP rule includes a multicast network address, the fourth URSP rule is determined as the URSP rule supporting the multicast service through a downlink transmission; or the value of the connection capabilities information includes a code value indicating multicast communication or broadcast communication, wherein, when a value of connection capabilities information in a fifth URSP rule is a code value indicating multicast communication and a third IP address descriptor for an MBS or multicast service or broadcast service in the fifth URSP rule includes a multicast network address, a port number, and a protocol identifier of a protocol above an IP protocol, the fifth URSP rule is determined as the URSP rule supporting the multicast service through downlink transmission.

* * * * *